(12) United States Patent
Yoshioka et al.

(10) Patent No.: US 6,466,522 B1
(45) Date of Patent: Oct. 15, 2002

(54) INDICATING PLATE FOR WATCHES

(75) Inventors: Hideki Yoshioka, Higashikurume; Katsuyuki Yamaguchi; Nobuo Ito, both of Tokyo; Yoshio Katsuki, Sayama; Noriyuki Totsuka, Tanashi, all of (JP)

(73) Assignee: Citizen Watch Co., Ltd., Tokyo (JP)

( * ) Notice: Subject to any disclaimer, the term of this patent is extended or adjusted under 35 U.S.C. 154(b) by 0 days.

(21) Appl. No.: 09/142,407

(22) PCT Filed: Mar. 6, 1997

(86) PCT No.: PCT/JP97/00701

§ 371 (c)(1),
(2), (4) Date: Sep. 4, 1998

(87) PCT Pub. No.: WO97/33208

PCT Pub. Date: Sep. 12, 1997

(30) Foreign Application Priority Data

| Mar. 8, 1996 | (JP) | 8-52059 |
| Apr. 2, 1996 | (JP) | 8-79761 |
| Dec. 2, 1996 | (JP) | 8-321866 |

(51) Int. Cl.[7] .............................................. G04B 1/00
(52) U.S. Cl. ...................................... 368/223; 368/205
(58) Field of Search ............................... 368/203–205, 368/228–232

(56) References Cited

U.S. PATENT DOCUMENTS

| 3,818,691 A | 6/1974 | Uchiyama | 58/23 C |
| 4,095,217 A | * 6/1978 | Tani et al. | 368/205 |
| 5,352,300 A | * 10/1994 | Niwa | 136/256 |
| 5,376,303 A | 12/1994 | Royce et al. | 252/301.4 |
| 5,424,006 A | 6/1995 | Murayama et al. | 252/301.4 |
| 5,841,738 A | * 11/1998 | Kamei et al. | 368/205 |
| 5,936,914 A | * 8/1999 | Yamaguchi et al. | 368/205 |
| 5,990,995 A | * 11/1999 | Ebihara et al. | 349/113 |
| 6,094,404 A | * 7/2000 | Hidai et al. | 368/205 |

FOREIGN PATENT DOCUMENTS

| EP | 0242088 | 10/1987 |
| EP | 0680097 | 11/1995 |
| FR | 522247 | 4/1972 |
| JP | 5-38464 | of 1985 |
| JP | 60148172 | 8/1985 |
| JP | 7-11250 | of 1995 |

* cited by examiner

Primary Examiner—Bernard Roskoski

(57) ABSTRACT

An indicating plate for a solar watch, comprising a color diffusion plate which, by virtue of the presence of a coloring agent, a coloring light diffusing agent, a colored translucent substrate, a pattern layer/colored thin film layer and a diffusion layer, is adapted to transmit a portion of light having a wavelength within a range capable of causing a solar cell housed under the indicating plate to generate power. The color diffusion plate is adapted to make it difficult to view the solar cell from the outside through the indicating plate and is also adapted to impart a color tone to the indicating plate.

57 Claims, 18 Drawing Sheets

(a)

(b)

INDICATING PLATE FOR WATCHES

BACKGROUND OF THE INVENTION

The present invention relates to an indicating plate for solar cell included in an indicating plate structure for solar cell comprising a solar battery (solar cell) housed in a watch, the solar cell being capable of converting light energy to electric energy, and an indicating plate (dial) for solar watch arranged on a front side of the solar cell. More particularly, the present invention is concerned with an indicating plate for solar watch or indicating plate for EL (electro-luminescence) watch that enables not only the attainment of a design variation such as coloring and multicoloring but also high quality and superior appearance.

It is common practice to employ a solar cell as a power source for watches, desktop electronic calculators and portable radio sets. This solar cell is generally constructed of, for example, amorphous silicon and converts light energy to electric energy. In view of this function, the solar cell must be arranged in a position upon which light is incident, i.e., a surface position such that the solar cell is directly visible from outside.

The solar cell is commonly used in an indicating plate structure for wristwatch, which is constructed so that, referring to FIGS. 36 and 37, four solar cells 632 which are fan-shaped in a plan view are arranged, with insulating band 633 therebetween, on an upper surface of wristwatch module 631 and so that translucent resin thin film layer 635 is laminated onto each of the solar cells 632 with transparent plate 634 of a transparent polycarbonate (polycarbonic ester) resin or acrylic resin interposed therebetween.

In this indicating plate structure for solar watch, however, the solar cells 632 are generally brown or dark-blue, so that, for example, the solar cells disposed under the transparent plate are viewed through the transparent plate. Thus, the dial takes on the color of the solar cells. Further, there is insulating band 633 between neighboring solar cells 632, so that the insulating bands 633 appear as cross lines. Thus, not only is the design inclusive of color tone extremely restricted but also the appearance is degraded to thereby lower the commercial value.

In contrast, a watch was proposed in which, for example, an interference filter was disposed on a front side of a solar cell to thereby prevent direct viewing of the solar cell. However, problems were encountered such that the supply of light energy to the solar cell was hampered and such that the appearance quality of the watch dial was poor.

For solving these problems, for example, Japanese Patent Publication No. 5(1993)-38464 disclosed a colored solar cell comprising a solar cell, a color filter disposed on a front side of the solar cell and capable of transmitting light having a wavelength within a region contributing to power generation of the solar cell, and a color diffusing layer composed of a scattering layer disposed between the solar cell and the color filter, which scattering layer was capable of transmitting portion of the light transmitted through the color filter and scattering the rest of the light in all directions.

A white diffusion plate was employed as this scattering layer, and it was suggested to use as the white diffusion plate, for example, an acrylic milk white plate, a half mirror coated with a matting clear lacquer, a glass having one side roughened by blasting or a white diffusion plate having a mirror formed of, for example, aluminum in a stripe or net pattern on a side opposite to plastic.

However, in this prior art, the use of the acrylic milk white plate as the scattering layer disenables obtaining a metal tone favored in an indicating plate of wristwatch and capable of imparting an appearance of superior quality. Further, burrs occur at the time of working, thereby necessitating deburring. Accordingly, the process is complicated and the cost is increased. With respect to the half mirror coated with a matting clear lacquer, half mirror treatment and coating are required to thereby complicate the process. Further, it is probable that, depending on coating operation, the film thickness becomes nonuniform to thereby cause a dispersion of transmission factor with the result that mottling occurs. Moreover, with respect to the glass having one side roughened by blasting or the white diffusion plate having a mirror formed of, for example, aluminum in a stripe or net pattern on a side opposite to plastic, blasting and mirror treatment are required to thereby complicate the process. Further, depending on these treatments, the problem is encountered such that the film thickness and irregularity degree become nonuniform to thereby invite a dispersion of transmission factor and a mottling. Furthermore, all the above materials have a problem such that the appearance quality thereof as a watch dial is poor.

At any rate, the interposition of the above scattering layer between the color filter and the solar cell unfavorably requires a complicated process, invites a dispersion of transmission factor leading to a deterioration of power generation. performance and invites mottling and a deterioration of appearance quality due to the property of material per se.

On the other hand, in the use of the conventional indicating plate for solar watch, it is difficult to view time or other information on the indicating plate in the night or other nonilluminated dark environment, thereby necessitating separately equipping the watch frame with an illuminator or the like.

An EL (electro-luminescence) equipped watch was already developed in which an EL cell having a transparent resin plate provided with transparent electrodes on its upper and lower surfaces, in which a phosphor such as zinc sulfide was dispersed, for the purpose of viewing time or other information on the indicating plate in the night or other nonilluminated dark environment was arranged under the indicating plate. In this watch as well, the same problem was encountered that the underlying EL cell was visible through the indicating plate.

Moreover, each of the conventional indicating plates for watches was composed of a single material, so that the entirety of the indicating plate exhibited only a single color, thereby disenabling a design diversification. In particular, with respect to the conventional indicating plate for solar watch and, indicating plate for EL watch, one composed of a precious stone, a shell or a combination thereof with a metal has not been developed, and no indicating plate enabling a design diversification and having a high quality and an appearance of superior quality has been proposed.

The present invention has been made taking the above problems into account. It is an object of the present invention to provide an indicating plate for solar watch through which, for example, the insulating band cross lines and solar cell positioned under the indicating plate are not visible, which indicating plate can be colored, enables greatly increased design variation inclusive of a high-quality pattern and tone (delicate color shade) and has an appearance of superior quality which enhances commercial value.

It is a further object of the present invention to provide an indicating plate for watch, especially, an indicating plate for solar watch or indicating plate for EL equipped watch through which, for example, the EL cell, insulating band cross lines and solar cell positioned under the indicating plate are not visible, which indicating plate can be colored or multicolored, enables greatly increased design variation inclusive of tone, makes a high-grade impression produced by the use of a fine member such as a precious stone and has an appearance of superior quality which enhances commercial value.

It is still a further object of the present invention to provide an indicating plate for watch, which is luminescent because of persistence characteristic, so that time can be viewed thereon in the night or other dark environment.

SUMMARY OF THE INVENTION

The present invention has been made with a view toward solving the above problems of the prior art and attaining the above objects. Accordingly, there is provided an indicating plate structure for solar watch comprising a solar cell housed in a watch and an indicating plate for solar watch arranged on a front side of the solar cell, the above indicating plate comprising a color diffusion plate adapted to transmit portion of light having a wavelength within a range capable of causing a solar cell housed under the indicating plate to generate power, out of light at least incident upon the indicating plate, through the indicating plate downward, the above color diffusion plate adapted to render difficult viewing of the solar cell from outside through the indicating plate and adapted to impart color tone to the indicating plate.

In another constitution of the present invention, the indicating plate for solar watch comprises an indicating plate substrate composed of a transparent resin and a light storing fluorescent layer formed on a light-incident-side surface of the indicating plate substrate, the above light storing fluorescent layer comprising a light diffusing agent and, as a coloring light diffusing agent, a light storing fluorescent material. Thus, both the above light diffusing function and coloring function can be effectively performed. That is, not only can the indicating plate be colored due to the tone (white tone) of the light storing fluorescent material to thereby enhance the visibility of the indicating plate but also the underlying solar cell, cross line, etc. are not visible through the indicating plate. Moreover, high-luminance persistence characteristic can be exerted by an excitation spectrum of slight light for a prolonged period of time because of the formation of long-persistance-type light storing fluorescent material on a front side of the indicating plate substrate to thereby enable viewing time in the night or other dark environment. Furthermore, the power generation of the solar cell is not obstructed because portion of light required for the solar cell to generate power, out of light incident upon the indicating plate, is transmitted through the indicating plate downward.

In the indicating plate for solar watch according to a further constitution of the present invention, the above indicating plate substrate composed of a transparent resin contains a light storing fluorescent material as a coloring light diffusing agent, so that both the above light diffusing function and coloring function can be more effectively performed.

In the indicating plate for solar watch according to still a further constitution of the present invention, both the light storing fluorescent layer and the indicating plate substrate composed of a transparent resin contain a light storing fluorescent material as a coloring light diffusing agent, so that both the above light diffusing function and coloring function can be still more effectively performed.

In still a further constitution of the present invention, the indicating plate for solar watch comprises an indicating plate substrate composed of a transparent resin and a colored layer formed on a light-incident-side surface of the indicating plate substrate, the above colored layer comprising a coloring agent. Thus, not only can the indicating plate be colored by the coloring layer but also the coloring agent per se has some diffusing capability, so that the underlying solar cell, etc. are not visible through the indicating plate.

In still a further constitution of the present invention, the indicating plate for solar watch comprises an indicating plate substrate composed of a transparent resin and a colored layer formed on a solar-cell-side surface of the indicating plate substrate, the above colored layer comprising a coloring agent, the above indicating plate substrate having minute irregularities formed on its light-incident-side; surface. Thus, not only can the indicating plate be colored by the coloring layer but also the coloring agent per se has some diffusing capability, so that the underlying solar cell, etc. are rendered invisible through the indicating plate by the diffusing function of the coloring agent per se and the light diffusing function of the minute irregularities.

In still a further constitution of the present invention, the indicating plate for solar watch comprises an indicating plate substrate composed of a transparent resin containing a dye or pigment as a coloring agent, the above indicating plate substrate having minute irregularities with light diffusing function formed on its light-incident-side surface. Thus, not only can the indicating plate be colored by the dye or pigment contained in the transparent resin but also the underlying solar cell, etc. are rendered invisible through the indicating plate by the diffusing function of the coloring agent per se and the light diffusing function of the minute irregularities. In the indicating plate for solar watch according to still a further constitution of the present invention, the transparent resin further contains a light diffusing agent, so that the underlying solar cell, etc. are more effectively rendered invisible through the indicating plate.

In still a further constitution of the present invention, the indicating plate for solar watch comprises an indicating plate substrate composed of a transparent resin containing a light diffusing agent and a reflecting layer formed on a solar-cell-side surface of the indicating plate substrate, the reflecting layer capable of performing a light diffusing function, and the indicating plate substrate having minute irregularities formed on its light-incident-side surface. This reflecting layer is a thin film capable of reflecting portion of light and absorbing other portion of light while transmitting the rest of light, so that the reflecting layer functions as a coloring agent. Therefore, not only is the tone of the reflecting layer recognized as that of the indicating plate but also the underlying solar cell, etc. are not visible through the indicating plate.

In still a further constitution of the present invention, the indicating plate for solar watch comprises a colored translucent substrate capable of transmitting light, a pattern layer disposed on a front side of the colored translucent layer and a colored thin film layer disposed on a back side of the colored translucent substrate.

By virtue of this constitution, portion of light of a wavelength range of series different from the color of the colored translucent substrate out of the light incident upon the colored translucent substrate is absorbed by the colored translucent substrate. Portion of the light of a wavelength range of the same series as the color of the colored translucent substrate is transmitted through the colored thin film layer to reach the solar cell, thereby contributing to power generation of the solar cell. The rest of the light is reflected toward the surface. This is because the colored thin film layer is an extremely thin film, so that it performs the function of transmitting portion of light while reflecting the rest of the light.

The light having been reflected by the colored thin film layer has directivity and is inhomogeneous. However, this light is diffused by the dye or pigment mixed in the colored translucent substrate and the pattern layer and reaches the eyes of the viewer. Therefore, the viewer views, on the entire surface of the colored translucent substrate, the pattern layer together with a delicate hue comprising a uniform combination of the color of the colored thin film layer with the color of the colored translucent substrate as a base. As a result, the brown or dark-blue solar cell and insulating band cross lines are not viewed through the indicating plate.

Therefore, designing can be diversified to thereby realize the same design expression as made in the conventional indicating plate. Thus, not only is a design variation inclusive of a tone and pattern imparting a high-grade feeling markedly increased but also a delicate hue can be provided so that the appearance quality is enhanced to thereby contribute to an increase of commercial value.

In the indicating plate for solar watch according to still a further constitution of the present invention, the above colored thin film layer is a metallized layer.

By virtue of this constitution, portion of light of a wavelength range of a different series from the color of the colored translucent substrate out of the light incident upon the colored translucent substrate is absorbed by the colored translucent substrate. Portion of the light of a wavelength range of the same series as the color of the colored translucent substrate is transmitted through the metallized layer to reach the solar cell, thereby contributing to power generation of the solar cell. The rest of the light is reflected toward the surface. This is because the metallized layer is an extremely thin film, so that it performs the function of transmitting portion of light while reflecting the rest of the light.

The light having been reflected by the metallized layer has directivity and is inhomogeneous. However, this light is diffused by the dye or pigment mixed in the colored translucent substrate and the pattern layer and reaches the eyes of the viewer. Therefore, the viewer views, on the entire surface of the colored translucent substrate, the pattern layer together with a delicate hue comprising a uniform combination of the color of the metallized layer with the color of the colored translucent substrate as a base. As a result, the brown or dark-blue solar cell and insulating band cross lines are not visible through the indicating plate.

Therefore, designing can be diversified to thereby realize the same design expression as made in the conventional indicating plate. Thus, not only is a design variation inclusive of a tone and pattern imparting a high-grade feeling markedly increased but also a delicate hue can be provided so that the appearance quality is enhanced to thereby contribute to an increase of commercial value.

In still a further constitution of the present invention, the indicating plate for solar watch comprises a transparent substrate capable of transmitting light, a pattern layer disposed on a front side of the transparent substrate, a diffusion layer disposed on a back side of the transparent substrate and a colored thin film layer disposed on the diffusion layer.

By virtue of this constitution, portion of the light incident upon the transparent substrate is transmitted through the diffusion layer and the colored thin film layer to reach the solar cell, thereby contributing to power generation of the solar cell. The rest of the light is diffused and reflected toward the surface by the colored thin film layer and diffusion layer disposed on a back side of the transparent substrate. This is because the colored thin film layer is an extremely thin film, so that it performs the function of transmitting portion of light while reflecting the rest of the light. The light having been diffused and reflected by the diffusion layer and colored thin film layer has directivity and is inhomogeneous. However, this light is further diffused (scattered) by the pattern layer disposed on a surface of the transparent substrate. Therefore, the viewer views, homogeneously on the entire surface of the transparent substrate, the pattern layer together with the color of the colored thin film layer. As a result, the brown or dark-blue solar cell and insulating band cross lines are not viewed through the indicating plate.

Therefore, designing can be diversified to thereby realize the same design expression as made in the conventional indicating plate. Thus, not only is a design variation inclusive of a tone and pattern imparting a high-grade feeling markedly increased but also a delicate hue can be provided so that the appearance quality is enhanced to thereby contribute to an increase of commercial value.

In the indicating plate for solar watch according to still a further constitution of the present invention, the transparent substrate, the pattern layer and the diffusion layer are monolithically formed.

By virtue of this constitution, not only can the same functions as those of the above invention be performed but also, because of the monolithic formation of the transparent substrate, the pattern layer and the diffusion layer, the pattern layer can be formed into, for example, Piazzi cut or glory-of-rising-sun pattern with the result that a design variation inclusive of a tone and pattern imparting a high-grade feeling is markedly increased so that the appearance quality is enhanced to thereby contribute to an increase of commercial value.

In the indicating plate for solar watch according to still a further constitution of the present invention, the colored thin film layer is a metallized layer.

By virtue of this constitution, portion of the light incident upon the transparent substrate is transmitted through the diffusion layer and the metallized layer to reach the solar cell, thereby contributing to power generation of the solar cell. The rest of the light is diffused and reflected toward the surface by the metallized layer and diffusion layer disposed on a back side of the transparent substrate. This is because the metallized layer is an extremely thin film, so that it performs the function of transmitting portion of light while reflecting the rest of the light. The light having been diffused and reflected by the diffusion layer and metallized layer has directivity and is inhomogeneous. However, this light is further diffused (scattered) by the pattern layer disposed on a surface of the transparent substrate. The viewer views, homogeneously on the entire surface of the transparent substrate, the pattern layer together with the color of the metallized layer. As a result, the brown or dark-blue solar cell and insulating band cross lines are not viewed through the indicating plate.

Therefore, designing can be diversified to thereby realize the same design expression as made in the conventional indicating plate. Thus, not only is a design variation inclusive of a tone and pattern imparting a high-grade feeling markedly increased but also a delicate hue can be provided so that the appearance quality is enhanced to thereby contribute to an increase of commercial value.

In another aspect of the present invention, there is provided a disklike indicating plate for watch adapted to be assembled in a watch frame, which has at least a portion thereof exposed at its front side composed of an indicating member comprising at least two different types of members and at least one of which is capable of transmitting light downward.

In the indicating plate for watch according to a particular constitution of this invention, the indicating member comprises an inner-boundary-side member and a peripheral-side member.

In this indicating plate for watch, the inner-boundary-side member and peripheral-side member may be composed of respective different materials selected from among appropriate combinations of natural materials, for example, precious stones such as sapphire, blue pearl, onyx and tiger's-eye, shells such as white pearl oyster shell, glass and ceramics such as $Al_2O_3$ and synthetic materials, for example, metals such as titanium, SUS 304 and other stainless steels and brass, german silver and other copper alloys and plastics such as polycarbonate and polyacetal resins.

In the indicating plate for watch according to another constitution of the present invention, the inner-boundary-side member is fitted in a central opening provided in the peripheral-side member. In this constitution, the indicating plate can be colored and multicolored. Appropriate selection of materials enables not only inhibiting the view of the solar cell, etc. through the indicating plate but also markedly increasing a design variation inclusive of tone. Moreover, the use of a high-quality member such as a precious stone enables providing the indicating plate for watch that imparts a high-grade feeling and ensures an excellent appearance quality to thereby ensure a high commercial value.

In the indicating plate for watch according to a further constitution of the present invention, the inner-boundary-side member is fitted in a central recess provided in the peripheral-side member. In this constitution as well, the same effects can be exerted. Furthermore, by virtue of the positioning (piling) of the peripheral-side member under the inner-boundary-side member, not only is viewing of the solar cell through the indicating plate prevented but also a strength increase is attained. Depending on combination of materials, the tones of peripheral-side member and inner-boundary-side member lie one on the other so that a delicate hue can be bred in the center of the indicating plate to thereby increase a design variation.

In the indicating plate for watch according to still a further constitution of the present invention, the inner-boundary-side member a central protrusion provided in the inner-boundary-side member is fitted in a central opening provided in the peripheral-side member so that the inner-boundary-side member is coupled with the peripheral-side member. In this constitution as well, the same effects can be exerted. Furthermore, by virtue of the positioning (piling) of the inner-boundary-side member under the peripheral-side member, not only is viewing of the solar cell through the indicating plate prevented but also a strength increase is attained. Depending on combination of materials, the tones of inner-boundary-side member and peripheral-side member lie one on the other so that a delicate hue can be bred in the periphery of the indicating plate to thereby increase a design variation.

In the indicating plate for watch according to still a further constitution of the present invention, a base material of the same material as that of the inner-boundary-side member and the peripheral-side member is bonded to backs of the inner-boundary-side member and the peripheral-side member. In this constitution as well, the same effects can be exerted. Furthermore, by virtue of the positioning (piling) of the base material under the peripheral-side member and inner-boundary-side member, not only is a further strength increase attained but also viewing of the solar cell through the indicating plate is prevented. Depending on combination of materials, the tone of the peripheral-side member and inner-boundary-side member and the tone of the base material lie one on the other so that a delicate hue can be bred in the entirety of the indicating plate to thereby increase a design variation.

In the indicating plate for watch according to still a further constitution of the present invention, the peripheral-side member and base material are composed of a natural material selected from among precious stones, shells, glasses and ceramics, and a periphery of the peripheral-side member and base material is fitted with a ringlike mounting member composed of a metal or a plastic and provided with a fixing part for fixing the indicating plate to a watch frame. In still a further constitution of the present invention, a back side of the mounting member is provided with a collar part that is protrudent inward from a circumferential part of a central opening provided in the mounting member, the above central opening and collar part forming a recess, in which the peripheral-side member and base material are fitted in the recess. When a natural material such as a precious stone, a shell or a ceramic is used as the peripheral-side member and base material, it is difficult to effect a working such as protrusion or notch for fixing the indicating plate to a watch frame, thereby inviting a cost increase. However, the mounting member of, for example, a metal or a plastic can be easily worked, so that a spacing corresponding to the thickness (100 to 200 µm) of the collar part of the mounting member is provided between the indicating plate members and the module 4 arranged thereunder. Therefore, even if the module is deformed, for example, at the time of impact, the influence of the deformation is avoided and the indicating plate for watch will not suffer from cracking or damaging. Thus, neither appearance nor product quality is deteriorated.

The indicating plate for watch according to still a further constitution of the present invention is an indicating plate for solar watch included in an indicating plate structure for solar watch comprising a solar cell housed in a watch and an indicating plate for solar watch arranged on a front side of the solar cell. In still a further constitution of the present invention, the indicating plate for watch has a transmission factor of light contributing to power generation of 10 to 60%. In this constitution, not only are the functions of the solar watch ensured but also the underlying solar cell, etc. are not viewed through the indicating plate to thereby realize the above increase of design variation.

DETAILED DESCRIPTION OF

Embodiments of the present invention will be described in detail below with reference to the drawings.

Figure 1:
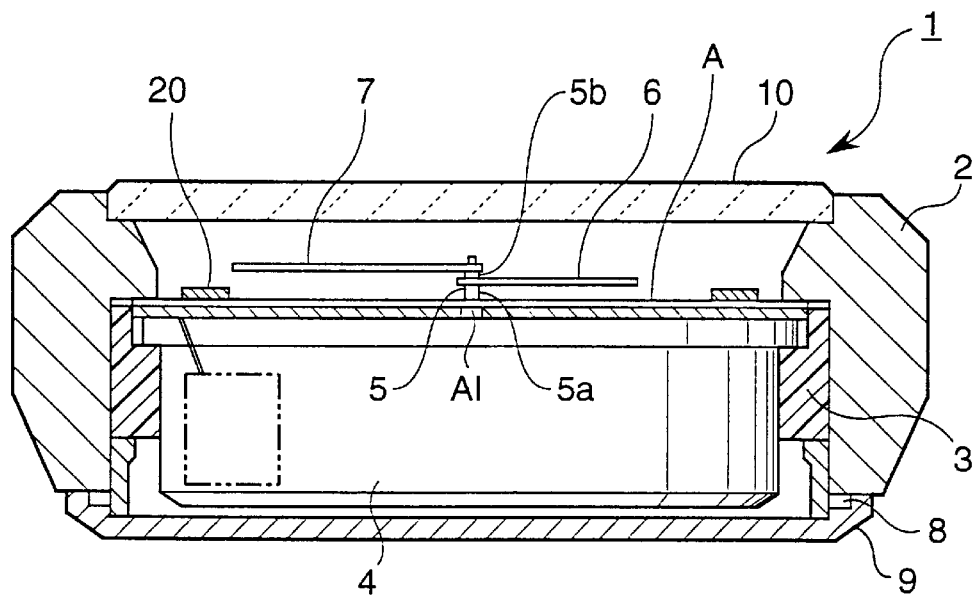
FIG. 1 is a sectional view of a wristwatch equipped with the indicating plate for solar watch according to the first embodiment of the present invention.
Figure 2:
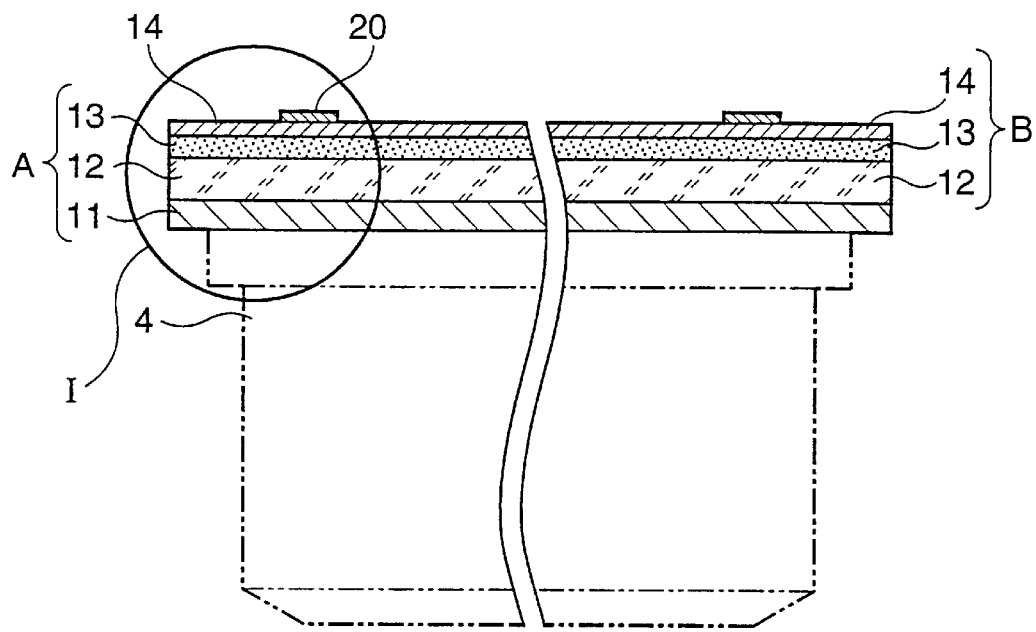
FIG. 2 is a sectional view of an indicating plate structure for solar watch equipped with the indicating plate for solar watch according to the first embodiment of the present invention.
Figure 3:
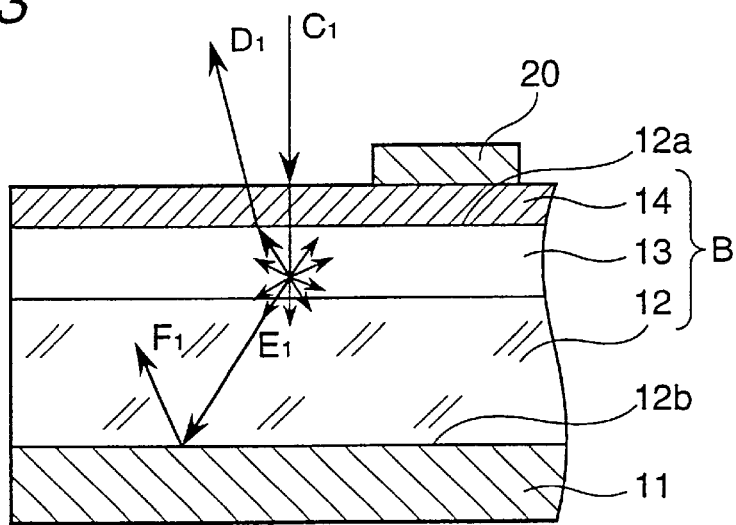
FIG. 3 is an enlarged view of portion I of FIG. 2.

FIG. 1 is a sectional view of a wristwatch equipped with the indicating plate for solar watch according to the first embodiment of the present invention. FIG. 2 is a sectional view of an indicating plate structure for solar watch equipped with the indicating plate for solar watch according to the first embodiment of the present invention. FIG. 3 is an enlarged view of portion I of FIG. 2.

Referring to FIG. 1, module 4 is fixed by means of support frame 3 of a synthetic resin, fitted in an internal part of outer barrel 2. Indicating plate structure for solar watch A is provided on a front side of the module 4. Hand axle 5 of a double axle construction provided on the module 4 is arranged through central hole A1 made in the indicating plate structure for solar watch A, and outer axle 5a and inner axle 5b of the hand axle 5 are fitted with hour hand 6 and minute hand 7, respectively. Further, back lid 9 is secured through waterproof packing 8 to the bottom side of the outer barrel 2, and windshield glass 10 is secured to the front side of the outer barrel 2, thereby constituting wristwatch 1.

The indicating plate structure for solar watch A consists essentially of solar cell 11 secured to a front side of the module 4 and indicating plate for solar watch B disposed on a front side of the solar cell 11 (same as in the following embodiments) as shown in FIG. 2.

Figure 36:
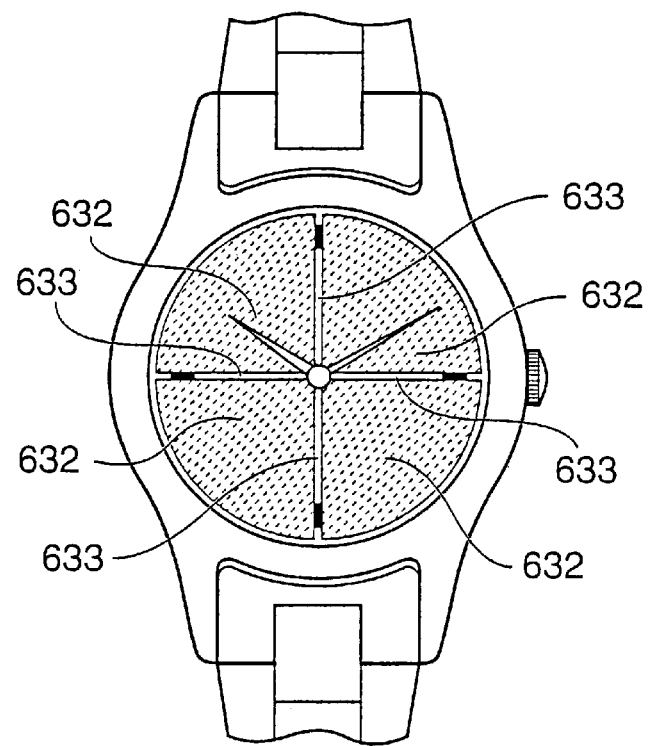
FIG. 36 is a plan view of a wristwatch equipped with conventional indicating plate structure for solar watch.
Figure 37:
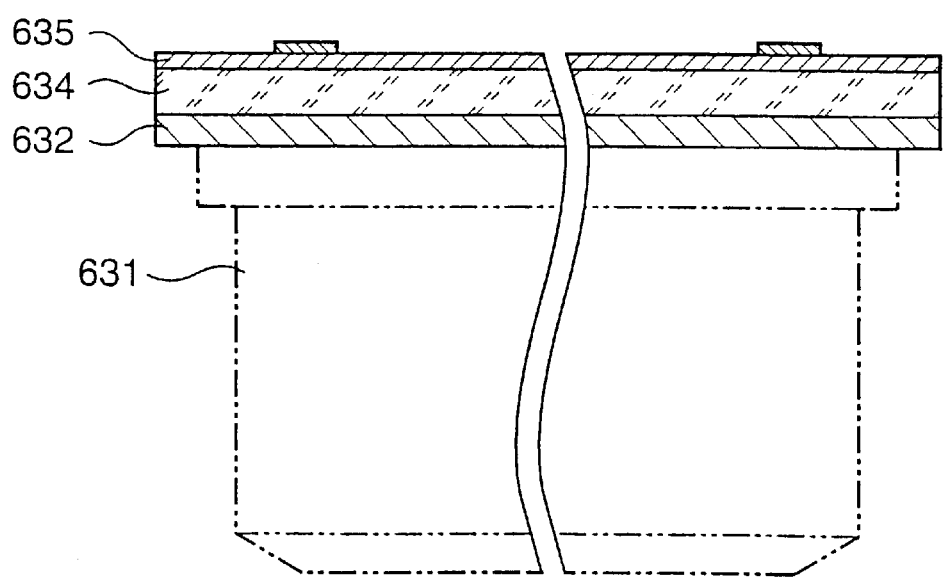
FIG. 37 is a sectional view of conventional indicating plate structure for solar watch.

The indicating plate for solar watch B is constructed of indicating plate substrate (dial base material) 12 composed of a transparent resin, light storing fluorescent layer 13 disposed on front side (light incident side) 12a of the indicating plate substrate 12, in which a light diffusing agent and a persistent light storing fluorescent material functioning as a coloring light diffusing agent are mixed, and transparent or translucent surface protective coating layer 14 formed on the top of the light storing fluorescent layer 13. The surface protective coating layer 14 has its surface provided with preselected print/time character 20 by printing or mounting (in all the following embodiments, although not particularly mentioned, the print/time character 20 is disposed on the topmost layer without exception). As shown in FIG. 36 for the prior art, the solar cell 11 is fan-shaped in plan form, and four solar cells 11 are arranged with insulating bands interposed therebetween.

A plate of a transparent resin such as an acrylic resin or a polycarbonate (polycarbonic ester) resin is preferably used as the above indicating plate substrate 12 of transparent resin, which is shaped by a blank die operated so that a predetermined size corresponding to the size of wristwatch is obtained.

The light storing fluorescent layer 13 can be formed by blending 3 to 18% by weight, preferably, 5 to 15% by weight, still preferably, 8 to 12% by weight of a light diffusing agent with powder of a light storing fluorescent material (light storing luminous paint), mixing a binder of transparent resin with the blend and applying the mixture to the front side of the indicating plate substrate 12 by coating, screen printing, pad printing or the like. The binder is preferably used in an amount of 35 to 65 parts by weight per 100 parts by weight of light storing fluorescent material. The reason for the above limitation of the blending proportion of the light diffusing agent is that, when the amount of the light diffusing agent is greater than 18% by weight, not only is the amount of light absorbed (accumulated) by the light storing fluorescent material reduced to thereby decrease light storing power and shorten luminescent time but also it is likely to prevent light required for power generation of the solar cell from reaching the solar cell. Furthermore, the reason is that, when on the other hand the amount of the light diffusing agent is smaller than 3% by weight, the solar cell lying under the indicating plate is viewed through the indicating plate to thereby invite the possibility of causing a decrease in appearance quality.

The thickness of the light storing fluorescent layer 13 is preferably in the range of 50 to 150 μm, still preferably, 80 to 120 μm. This is because there is a limit in the depth of penetration of external light (incident light) within a given period of time, so that, even if the thickness of the light storing fluorescent layer 13 is increased over a given value, the amount of light stored encounters a limit. Moreover, the reason is that, when the thickness of the light storing fluorescent layer 13 is too large, the light transmission becomes poor and that, when on the other hand the thickness of the light storing phosphor layer 13 is too small, the solar cell lying under the indicating plate is viewed through the indicating plate unfavorably from the viewpoint of appearance quality and, further, the amount of light storing fluorescent material is reduced to thereby shorten luminescent time.

As for the above binder, for example, any of acrylic resins, urethane resins, resins obtained by modifying these resins, UV curable acrylic resins and UV curable urethane resins can be used. The resins can be cured by, for example, thermal curing, UV curing or cold curing technique.

On the other hand, as the light diffusing agent, for example, any of powdery silicic acid, powdery calcium carbonate and powdery calcium phosphate can be used. From the viewpoint of desired diffusion effect, it is preferred that the particle size thereof range from 5 to 15 μm, especially, about 8 to 12 μm.

A long persistent light storing fluorescent material is preferably used as the above light storing fluorescent material. In the use in a solar watch, it is preferred to employ a light storing fluorescent material exhibiting a high light transmission factor so that power generation of the solar cell is not prevented. It is further preferred that the light storing fluorescent material have a tone of superior quality and be brilliantly luminescent for a duration prolonged as much as possible in a dark environment.

As the above light storing fluorescent material, a green luminescent light storing fluorescent material disclosed in Japanese Patent Laid-open Publication No. 7(1995)-011250, i.e., a light storing fluorescent material containing as a base crystal a compound represented by the formula $MAl_2O_4$, in which M represents at least one metallic element selected from the group consisting of calcium, strontium and barium, a light storing fluorescent material composed of a combination of the above at least one metal selected from the group consisting of calcium, strontium and barium with magnesium or a light storing fluorescent material obtained by adding thereto europium as an activator in an amount of 0.001 to 10 mol % per the metallic element represented by the above M can be used.

As the light storing fluorescent material, use also can be made of a bluish-green luminescent light storing fluorescent material represented by the composition formula:

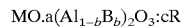

$MO \cdot a(Al_{1-b}B_b)_2O_3 : cR$ $0.5 \leq a \leq 10.0$
$0.0001 \leq b \leq 0.5$
$0.0001 \leq c \leq 0.2$ wherein MO represents at least one divalent metal oxide selected from the group consisting of MgO, CaO, SrO and ZnO, and R represents at least one rare earth element selected from the group consisting of Pr, Nd, Dy and Tm plus $Eu^{2+}$, as disclosed in U.S. Pat. No. 5,376,303. Other light storing fluorescent materials also naturally can be utilized.

The surface protective coating layer 14 can be formed on a surface of the light storing fluorescent material layer 13 by applying a transparent resin (transparent ink) or translucent resin (colored ink) of, for example, an acrylic resin, a urethane resin, an alkyd resin or an epoxy resin by screen printing or pad printing, or by applying a transparent paint or colored paint thereof by coating. The surface protective coating layer 14 is provided in order to prevent deterioration of the light storing fluorescent material. If characters or numerals are printed directly on the surface of the light storing fluorescent layer 13, printing ink bleeds to thereby cause difficulty. Therefore, it is preferred that printing of preselected characters and numerals be performed through the medium of the surface protective coating layer. The surface protective coating layer 14 is preferably composed of a transparent resin. The surface protective coating layer 14 can be omitted. According to necessity, the surface of the surface protective coating layer 14 can be polished by lapping or buffing so that it is smoothed and rendered glossy to thereby enhance an appearance quality as an indicating plate.

It is preferred that mirror polishing (specular finishing) by, for example, buffing be applied to surface 12b of the indicating plate substrate 12 on its side of solar cell 11 in order to prevent incident light transmitted through the indicating plate substrate 12 and heading toward the solar cell from undergoing irregular reflection at the interface of the indicating plate substrate 12 and the solar cell to thereby cause such a diffusion that power generating capability of the solar cell is deteriorated.

The action shown in FIG. 3 is exerted in the indicating plate structure for solar watch A including the indicating plate for solar watch B of the above construction according to the present invention.

That is, light C1 incident from outside upon the indicating plate for solar watch B is divided by the surface protective coating layer 14 into light having a wavelength within such a range that the light is absorbed (accumulated) by the light storing fluorescent layer 13 and light having a wavelength within such a range that the light is scattered by the light storing fluorescent material and light diffusing agent of the light storing fluorescent layer 13. Nevertheless, portion of the incident light C1 directly reaches the solar cell 11.

Light absorbed (accumulated) by the light storing fluorescent layer 13 causes the long persistent light storing fluorescent layer 13 to be luminescent in the night or other dark environment. On the other hand, portion D1 of the light scattered by the light storing fluorescent material and light diffusing agent of the light storing fluorescent layer 13 heads upward to reach the eyes of viewer. Thus, the viewer sees the light storing fluorescent layer 13 and recognizes the tone (white tone) possessed by the light storing fluorescent layer 13 as the indicating plate B. That is, light of the wavelength range of color of the same series as the tone of the light storing fluorescent layer 13 is scattered by the light storing fluorescent material and light diffusing agent of the light storing fluorescent layer 13 to thereby reach the eyes of viewer. Thus, not only does the tone of light storing fluorescent layer 13 recognized by the viewer beautify the appearance of the indicating plate structure for solar watch A but also light of the wavelength range of color of a different series from the tone of the light storing fluorescent layer 13 causes the light storing fluorescent layer 13 to be luminescent in the night or other dark environment.

Portion E1 of the light scattered by the light storing fluorescent material and light diffusing agent of the light storing fluorescent layer 13 heads downward, passes through the light storing fluorescent layer 13 and the indicating plate substrate 12 and reaches the solar cell 11 lying under the indicating plate substrate 12 to thereby contribute to power generation thereof. In this instance, portion F1 of the light E1 incident upon the solar cell 11 is reflected upward by the solar cell 11. If the reflected light passes through the indicating plate for solar watch B and reaches the eyes of viewer, the solar cell 11 is perceived by the viewer. However, portion of the light F1 having been reflected upward by the solar cell 11 is absorbed (accumulated) by the light storing fluorescent material of the light storing fluorescent layer 13 to thereby contribute to luminescence in a dark environment, so that no serious problem arises. That is, the rest of reflected light F1 having not been absorbed by the light storing fluorescent material of the light storing fluorescent layer 13 is scattered by the light storing fluorescent material and light diffusing agent of the light storing fluorescent material layer 13. Portion of the scattered light heads upward to thereby reach the eyes of viewer. However, the amount thereof is extremely small as compared with that of the entirety of the reflected light F1, so that there is scarcely any probability of the solar cell 11 being perceived by the viewer.

With respect to the insulating band cross lines crosswise arranged between solar cells 11 as well, there is scarcely any probability of being perceived by the viewer by virtue of the same effect as described above.

As described in the section of prior art, commonly, the solar cells 11 are brown or dark-blue, so that the indicating plate becomes brown or dark-blue, and, further, insulating bands disposed between the solar cells 11 appear as cross lines. However, in the present invention, the persistent light storing fluorescent layer 13 with white tone in which the light diffusing agent and the light storing fluorescent material are mixed is provided on the front side of the indicating plate substrate 12, so that the brown or dark-blue solar cells 11 and insulating band cross lines are not viewed through the indicating plate. Coloring can be effected by virtue of the white tone exhibited by the light storing fluorescent material with the result that a design variation inclusive of tone is extensively increased to thereby enhance an appearance quality and, thus, enhance a commercial value.

Moreover, the long persistent light storing fluorescent material is disposed on the front side of the indicating plate substrate 12, so that high-luminance persistence characteristic can be exerted by an excitation spectrum of slight light for a prolonged period of time to thereby enable viewing time in the night or other dark environment.

Figure 4:
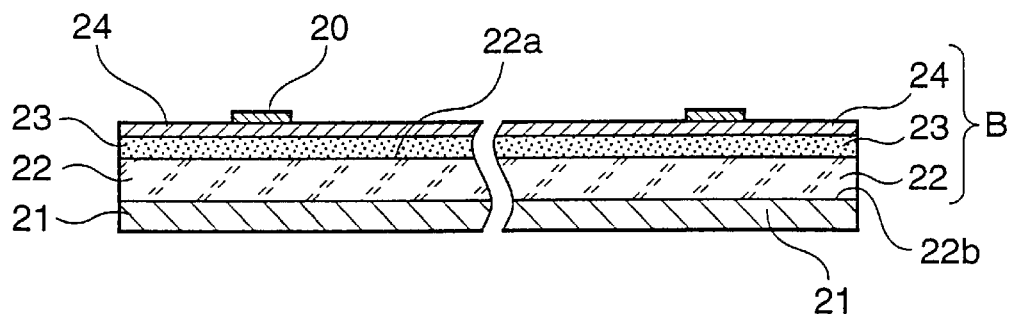
FIG. 4 is a sectional view of the indicating plate for solar watch according to the second embodiment of the present invention.

FIG. 4 is a sectional view of the indicating plate for solar watch according to the second embodiment of the present invention.

The construction of the indicating plate for solar watch B according to the second embodiment is the same as that of the first embodiment except that the indicating plate substrate 22 is one obtained by mixing a light storing fluorescent material as a coloring light diffusing agent in the indicating plate substrate 12 composed of a transparent resin according to the first embodiment.

That is, the indicating plate for solar watch B according to the second embodiment is constructed of indicating plate substrate 22 composed of a transparent resin containing a light storing fluorescent material as a coloring light diffusing agent, light storing fluorescent layer 23 disposed on front side (light incident side) 22a of the indicating plate substrate 22, in which a light diffusing agent and a light storing fluorescent material functioning as a coloring light diffusing agent are mixed, and transparent or translucent surface protective coating layer 24 formed on the top of the light storing fluorescent layer 23.

The above indicating plate substrate 22 composed of a transparent resin containing a persistent light storing fluorescent material can be produced by mixing a light storing fluorescent material (light storing luminous paint) in a transparent resin such as an acrylic resin or a polycarbonate (polycarbonic ester) resin, pelletizing the mixture and forming the pellets into a predetermined thickness, for example, 300 to 500 $\mu$m by injection molding. The same light storing fluorescent powder as in the first embodiment can be used as the light storing fluorescent material. The light storing fluorescent material is mixed in the transparent resin in an amount of 3 to 25% by weight, preferably, 5 to 20% by weight and, still preferably, 8 to 15% by weight. The reason is that, when the amount of powdery light storing fluorescent material is greater than 20% by weight, the molded indicating plate substrate 22 is likely to be brittle, have poor mechanical strength and exhibit such a poor light transmission so that power generation of the solar cell 21 is reduced. Moreover, the reason is that, on the other hand when the amount of powdery light storing fluorescent material is smaller than 5% by weight, the light storing capability of the light storing fluorescent material is likely to decrease to thereby shorten luminescent time.

The light storing fluorescent layer 23 and the surface protective coating layer 24 can be formed in the same manner as in the first embodiment. Moreover, that the surface protective coating layer 24 can be omitted, that the surface of the surface protective coating layer 24 can be polished to thereby obtain a smooth and glossy surface and that mirror polishing (specular finishing) can be applied to surface 22b of the indicating plate substrate 22 on its side of solar cell 21 in order to prevent lowering of the power generating capability of the solar cell are the same as in the first embodiment.

In the thus constructed indicating plate for solar watch B according to the second embodiment, not only is the persistent light storing fluorescent layer 23 with white tone in which the light diffusing agent and the light storing fluorescent material are mixed provided on the front side of the indicating plate substrate 22 as in the first embodiment but also the indicating plate substrate 22 per se contains the persistent light storing fluorescent material with white tone. Therefore, more effectively than in the first embodiment, the brown or dark-blue solar cells 21 and insulating band cross lines are not viewed through the indicating plate, and a design variation inclusive of tone is extensively increased to thereby enhance an appearance quality and, thus, enhance a commercial value.

Moreover, not only is the long persistent light storing fluorescent material disposed on the front side of the indicating plate substrate 22 but also the indicating plate substrate 22 per se contains the light storing fluorescent material. Therefore, more effectively than in the first embodiment, high-luminance persistence characteristic can be exerted by an excitation spectrum of slight light for a prolonged period of time to thereby enable viewing time in the night or other dark environment.

Figure 5:
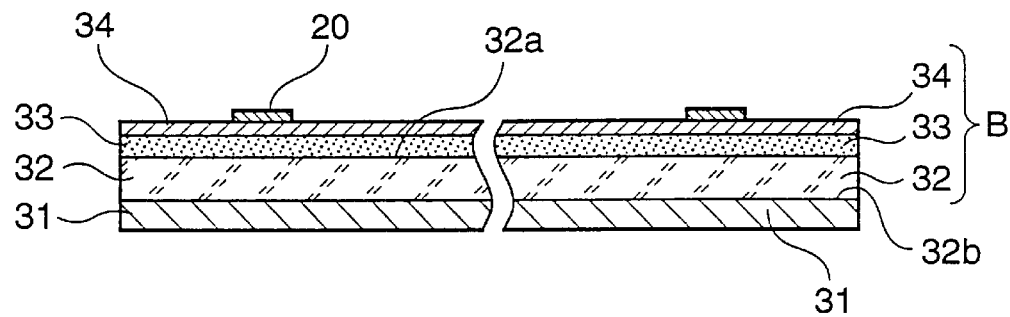
FIG. 5 is a sectional view of the indicating plate for solar watch according to the third embodiment of the present invention.

FIG. 5 is a sectional view of the indicating plate for solar watch according to the third embodiment of the present invention.

The construction of the indicating plate for solar watch B according to the third embodiment is the same as that of the second embodiment except that the light storing fluorescent layer 33 does not contain any light diffusing agent in place of the light storing fluorescent layer 13 of the second embodiment.

That is, the indicating plate for solar watch B according to the third embodiment is constructed of indicating plate substrate 32 composed of a transparent resin containing a persistent light storing fluorescent material as a coloring light diffusing agent, light storing fluorescent layer 33 disposed on front side 32a of the indicating plate substrate 32, in which alight storing fluorescent material as a coloring light diffusing agent is mixed, and transparent or translucent surface protective coating layer 34 formed on the top of the light storing fluorescent layer 33.

The above indicating plate substrate 32 composed of a transparent resin containing a persistent light storing fluorescent material can be produced by, as in the second embodiment, mixing a light storing fluorescent material (light storing luminous paint) in a transparent resin such as an acrylic resin or a polycarbonate (polycarbonic ester) resin, pelletizing the mixture and forming the pellets into a predetermined thickness of, for example, 300 to 500 µm by injection molding. The same light storing fluorescent powder as in the first embodiment can be used as the light storing fluorescent material. The light storing fluorescent material is mixed in the transparent resin in an amount of 3 to 25% by weight, preferably, 5 to 20% by weight and, still preferably, 8 to 15% by weight. The reason is that, when the amount of powdery light storing fluorescent material is greater than 20% by weight, the molded indicating plate substrate 22 is likely to be brittle, have poor mechanical strength and exhibit such a poor light transmission that power generation of the solar cell 31 is reduced. Furthermore, the reason is that, on the other hand when the amount of powdery light storing fluorescent material is smaller than 5% by weight, the light storing capability of the light storing fluorescent material is likely to decrease to thereby shorten luminescent time.

The light storing fluorescent layer 33 can be formed by mixing powder of a light storing fluorescent material (light storing luminous paint) with a binder of transparent resin and applying the mixture to the front side of the indicating plate substrate 32 by coating, screen printing, pad printing or the like. The binder is preferably used in an amount of 35 to 65 parts by weight per 100 parts by weight of light storing fluorescent material.

The thickness of the light storing fluorescent layer 33 is preferably in the range of 50 to 150 µm, still preferably, 80 to 120 µm. This is because there is a limit in the depth of penetration of external light (incident light) within a given period of time, so that, even if the thickness of the light storing fluorescent layer 33 is increased over a given value, the amount of light stored encounters a limit. Moreover, the reason is that, when the thickness of the light storing phosphor layer 33 is too large, the light transmission becomes poor and that, when on the other hand the thickness of the light storing fluorescent layer 33 is too small, the solar cell lying under the indicating plate is viewed through the indicating plate unfavorably from the viewpoint of appearance quality and, further, the amount of light storing fluorescent material is reduced to thereby shorten luminescent time.

As for the above binder, for example, any of acrylic resins, urethane resins, resins obtained by modifying these resins, UV curable acrylic resins and UV curable urethane resins can be utilized. These resins can be cured by, for example, thermal curing, UV curing or cold curing technique.

The light storing fluorescent layer 33 and the surface protective coating layer 34 can be formed in the same manner as in the first embodiment. Moreover, that the surface protective coating layer 34 can be omitted, that the surface of the surface protective coating layer 34 can be polished to thereby obtain a smooth and glossy surface and that mirror polishing (specular finishing) can be applied to surface 32b of the indicating plate substrate 32 on its side of solar cell 31 in order to prevent lowering of the power generating capability of the solar cell are the same as in the first embodiment.

In the thus constructed indicating plate for solar watch B according to the third embodiment, although the indicating plate substrate 32 per se contains a persistent light storing fluorescent material with white tone as in the second embodiment, the light storing fluorescent layer 33 does not contain any light diffusing agent and the persistent light storing fluorescent layer with white tone 33 containing the light storing fluorescent material only is provided on the front side of the indicating plate substrate 32. Therefore, although the diffusion effect is slightly inferior to that of the second embodiment, more effectively than in the prior art, the brown or dark-blue solar cells 31 and insulating band cross lines are not viewed through the indicating plate, and a design variation inclusive of tone is extensively increased to thereby enhance an appearance quality and, thus, enhance a commercial value.

Moreover, not only is the long persistent light storing fluorescent material disposed on the front side of the indicating plate substrate 32 but also the indicating plate substrate 32 per se contains the light storing fluorescent material. Therefore, more effectively than in the first embodiment, high-luminance persistence characteristic can be exerted by an excitation spectrum of slight light for a prolonged period of time to thereby enable viewing time in the night or other dark environment.

Figure 6:
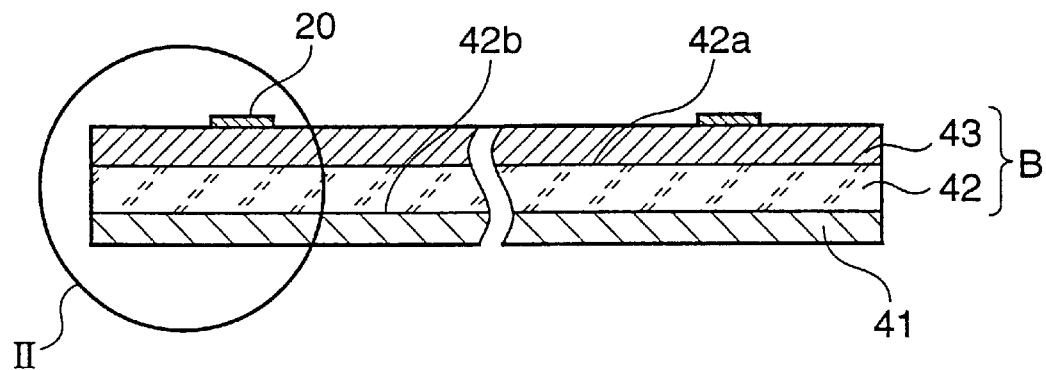
FIG. 6 is a sectional view of the indicating plate for solar watch according to the fourth embodiment of the present invention.
Figure 7:
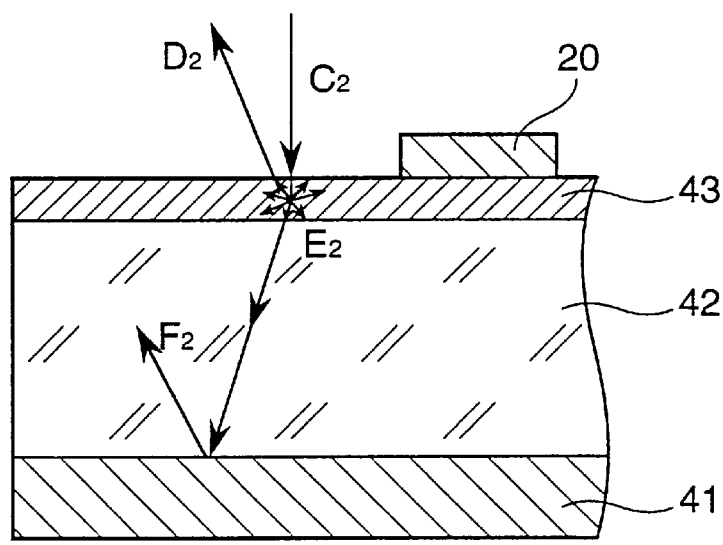
FIG. 7 is an enlarged view of portion II of FIG. 6.

FIG. 6 is a sectional view of the indicating plate for solar watch according to the fourth embodiment of the present invention. FIG. 7 is an enlarged view of portion II of FIG. 6.

The indicating plate for solar watch B according to the fourth embodiment comprises indicating plate substrate 42 composed of a transparent resin and colored layer 43 formed on front side (light incident side) 42a of the indicating plate substrate 42, the above colored layer 43 comprising a coloring agent.

A plate of a transparent resin such as an acrylic resin or a polycarbonate (polycarbonic ester) resin is preferably used as the above indicating plate substrate 42 of transparent resin, which is shaped by a blank die operated so that a predetermined size corresponding to the size of wristwatch is obtained.

The colored layer 43 can be formed by mixing a pearl pigment (for example, Pearl Grace (trade name) produced by Nippon Koken K.K.) in a white ink of, for example, an acrylic resin or a urethane resin in an amount of 20 to 40% by weight in accordance with desired appearance quality and applying the mixture to the front side of the indicating plate substrate 42 by screen printing, pad printing or coating so that the thickness of the colored layer 43 ranges from 10 to 25 $\mu$m, preferably, from 15 to 20 $\mu$m. The reason is that, when the thickness of the colored layer 43 is larger than 25 $\mu$m, the light transmission is likely to be poor to thereby lower the power generating capability of the solar cell. Furthermore, the reason is that, when on the other hand the thickness of the colored layer 43 is smaller than 10 $\mu$m, the underlying solar cell 41 is likely to be viewed through the indicating plate to thereby deteriorate appearance quality.

It is preferred that mirror polishing (specular finishing) by, for example, buffing be applied to surface 42b of the indicating plate substrate 42 on its side of solar cell 41 in order to prevent incident light transmitted through the indicating plate substrate 42 and heading toward the solar cell from undergoing irregular reflection at the interface of the indicating plate substrate 42 and the solar cell to thereby cause such a diffusion that power generating capability of the solar cell is deteriorated.

In the thus constructed indicating plate for solar watch B according to the fourth embodiment, the white ink and the pearl pigment of the colored layer 43 function as a coloring agent and a coloring light diffusing agent, respectively.

That is, as shown in FIG. 7, light C2 incident from outside upon the indicating plate for solar watch B is divided into light having a wavelength within such a range that the light is absorbed (accumulated) by the white ink and the pearl pigment of the colored layer 43 and light having a wavelength within such a range that the light is scattered by the white ink and the pearl pigment of the colored layer 43.

Portion D2 of the light scattered by the white ink and the pearl pigment of the colored layer 43 heads upward to reach the eyes of viewer. Thus, the viewer sees the colored layer 43 and recognizes the white tone (pearl tone) possessed by the colored layer 43 as the indicating plate B. That is, light of the wavelength range of color of the same series as the tone of the colored layer 43 is scattered by the white ink and the pearl pigment of the colored layer 43 to thereby reach the eyes of viewer. Thus, the tone of colored layer 43 recognized by the viewer beautifies the appearance of the indicating plate structure for solar watch A.

Portion E2 of the light scattered by the white ink and the pearl pigment of the colored layer 43 heads downward, passes through the colored layer 43 and the indicating plate substrate 42 and reaches the solar cell 41 lying under the indicating plate substrate 42 to thereby contribute to power generation thereof. In this instance, portion F2 of the light E2 incident upon the solar cell 41 is reflected upward by the solar cell 41. If the reflected light passes through the indicating plate for solar watch B and reaches the eyes of viewer, the solar cell 41 is perceived by the viewer. However, portion of the light F2 having been reflected upward by the solar cell 41 is absorbed (accumulated) by the white ink and the pearl pigment of the colored layer 43, so that no problem arises. That is, the rest of reflected light F2 having not been absorbed by the white ink and the pearl pigment of the colored layer 43 is scattered by the white ink and the pearl pigment of the colored layer 43. Portion of the scattered light heads upward to thereby reach the eyes of viewer. However, the mount thereof is extremely small as compared with that of the entirety of the reflected light F2, so that there is scarcely any probability of the solar cell 41 being perceived by the viewer.

With respect to the insulating band cross lines crosswise arranged between solar cells 41 as well, there is scarcely any probability of being perceived by the viewer by virtue of the same effect as described above.

Thus, the colored layer with white tone (pearl tone) 43 having the white ink and the pearl pigment mixed therein is provided on the front side of the indicating plate substrate 42, so that the brown or dark-blue solar cells 41 and insulating band cross lines are not viewed through the indicating plate and a design variation inclusive of tone is extensively increased to thereby enhance an appearance quality and, thus, enhance a commercial value.

Figure 8:
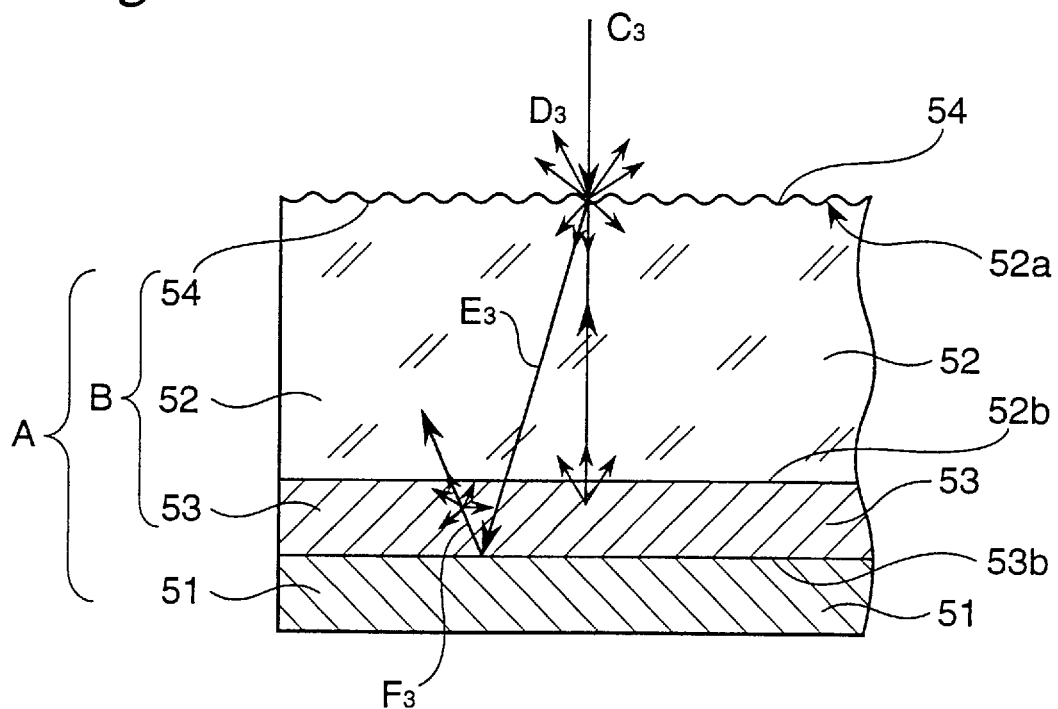
FIG. 8 is a sectional view of the indicating plate for solar watch according to the fifth embodiment of the present invention.

FIG. 8 is a sectional view of the indicating plate for solar watch according to the fifth embodiment of the present invention.

The indicating plate for solar watch B according to the fifth embodiment comprises indicating plate substrate 52 composed of a transparent resin and colored layer (printed layer) 53 formed on solar-cell-side surface 52b of the indicating plate substrate, the above colored layer comprising a coloring agent, the above indicating plate substrate 52 having minute irregularities 54 capable of light diffusion formed on its light-incident-side surface 52a.

A plate of a transparent resin such as an acrylic resin or a polycarbonate (polycarbonic ester) resin is preferably used as the above indicating plate substrate 52 of transparent resin, which is shaped by a blank die operated so that a predetermined size corresponding to the size of wristwatch, for example, 300 to 50 $\mu$m thickness is obtained.

The minute irregularities 54 can be formed by conducting a diffusion printing or a mat finishing by monolithic molding.

For example, the diffusion printing can be conducted by a method in which a light diffusing agent such as silicic acid, calcium carbonate, calcium phosphate or barium titanate, a vehicle such as an acrylic resin, a urethane resin, an alkyd resin or an epoxy resin and a diluent such as toluene or xylene are mixed together and the mixture is printed on a surface of the indicating plate substrate 52 by screen printing, pad printing, offset printing or the like so that a suitable thickness is obtained in conformity with desired light transmission and hue. It is preferred that the light diffusing agent be used in an amount of 2 to 10 g, especially, 5 to 7 g, the vehicle in an amount of 6 to 14 g, especially, 8 to 12 g and the diluent in an amount of 0.6 to 2.0 g.

On the other hand, the monolithic molding can be conducted by a method in which a fine pattern finishing or mat finishing by honing is applied onto an upper surface side of an injection molding die and injection molding is conducted into a predetermined dimension, for example, 300 to 50 µm thickness, or a method in which injection molding is first conducted and, thereafter, a mat finishing or fine patterning is applied by machining or chemical processing such as etching.

The coloring agent containing colored layer 53 provided on the solar-cell-side surface 52b of the indicating plate substrate can be produced by the use of an ink comprising a vehicle and, blended therein, a dye or a pigment.

It is preferred that mirror polishing (specular finishing) by, for example, buffing be applied to surface 53b of the colored layer 53 on its side of solar cell 51 in order to prevent incident light transmitted through the colored layer 53 and heading toward the solar cell from undergoing irregular reflection at the interface of the colored layer 53 and the solar cell to thereby cause such a diffusion that power generating capability of the solar cell is deteriorated.

In the thus constructed indicating plate for solar watch B according to the fifth embodiment, the dye or pigment of the colored layer 53 functions as a coloring agent, and the minute irregularities 54 formed on the light-incident-side surface 52a of the indicating plate substrate 52 possess light diffusing function.

That is, light C3 incident from outside upon the indicating plate for solar watch B is divided into light having a wavelength within such a range that the light is absorbed by the dye or pigment of the colored layer 53 and light having a wavelength within such a range that the light is scattered by the minute irregularities 54 formed on the light-incident-side surface 52a of the indicating plate substrate 52.

Portion D3 of the light scattered by the minute irregularities 54 heads downward and is scattered by the colored layer 53 so that portion thereof heads upward to reach the eyes of viewer. Thus, the viewer sees the colored layer 53 and recognizes the tone possessed by the colored layer 53 as the indicating plate B. That is, light of the wavelength range of color of the same series as the tone of the colored layer 53 is scattered by the irregularities 54 to thereby reach the eyes of viewer. The tone of colored layer 53 recognized by the viewer beautifies the appearance of the indicating plate structure for solar watch A.

Portion E3 of the light scattered by the irregularities 54 heads downward, passes through the indicating plate substrate 52 and the colored layer 53 and reaches the underlying solar cell 51 to thereby contribute to power generation thereof. In this instance, portion F3 of the light E3 incident upon the solar cell 51 is reflected upward by the solar cell 51. If the reflected light passes through the indicating plate for solar watch B and reaches the eyes of viewer, the solar cell 51 is perceived by the viewer. However, portion of the light F3 having been reflected upward by the solar cell 51 is absorbed by the dye or pigment of the colored layer 53, so that no problem arises. That is, the rest of reflected light F3 having not been absorbed by the dye or-pigment of the colored layer 53 is scattered by the irregularities 54. Portion of the scattered light heads upward to thereby reach the eyes of viewer. However, the amount thereof is extremely small as compared with that of the entirety of the reflected light F3, so that there is scarcely any probability of the solar cell 51 being perceived by the viewer.

With respect to the insulating band cross lines crosswise arranged between solar cells 51 as well, there is scarcely any probability of being perceived by the viewer by virtue of the same effect as described above.

Thus, the colored layer 53 containing the dye or pigment is provided on the back side of the indicating plate substrate 52 by printing and the minute irregularities 54 capable of light diffusion are provided on the light-incident-side surface of the indicating plate substrate 52, so that the brown or dark-blue solar cells 51 and insulating band cross lines are not viewed through the indicating plate and a design variation inclusive of tone is extensively increased to thereby enhance an appearance quality and, thus, enhance a commercial value.

Figure 9:
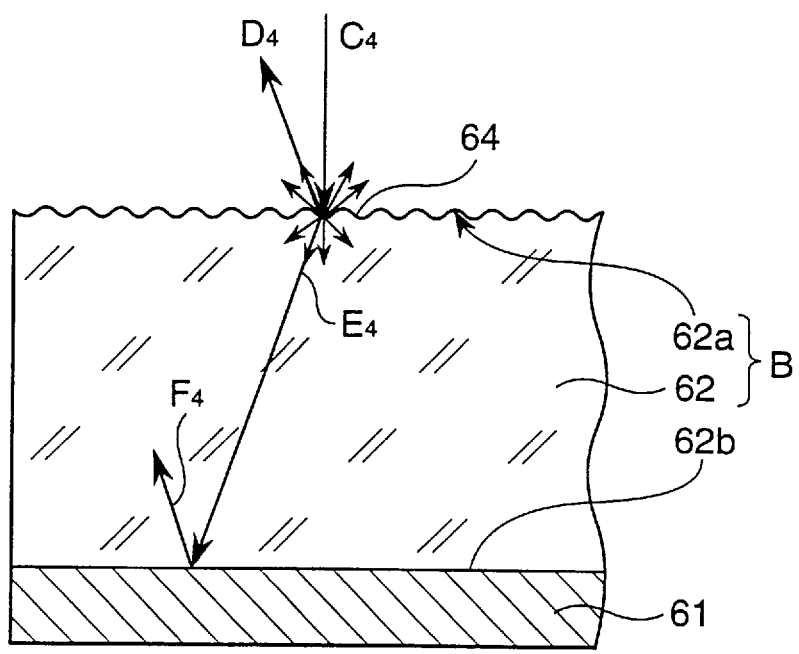
FIG. 9 is a sectional view of the indicating plate for solar watch according to the sixth embodiment of the present invention.

FIG. 9 is a sectional view of the indicating plate for solar watch according to the sixth embodiment of the present invention.

The indicating plate for solar watch B according to the sixth embodiment comprises indicating plate substrate 62 composed of a transparent resin containing a dye or pigment as a coloring agent, the above indicating plate substrate 62 having minute irregularities formed as a light diffusing working on its light-incident-side surface 62a.

The indicating plate substrate 62 can be produced by mixing a dye or pigment in a transparent resin such as an acrylic resin or a polycarbonate (polycarbonic ester) resin, pelletizing the mixture and forming the pellets into a predetermined dimension, for example, 300 to 500 µm thickness by injection molding. The mixing ratio of the dye or pigment can appropriately be decided taking the tone and light transmission into account. When the amount of dye or pigment is too large, the light transmission is likely to be poor. On the other hand, when the amount of dye or pigment is too small, the solar cell lying under the indicating plate is likely to be viewed through the indicating plate unfavorably from the viewpoint of appearance quality. Taking these into consideration, the dye or pigment is used in an amount of 0.5 to 10% by weight, preferably, 1 to 7% by weight and, still preferably, 2 to 5% by weight based on transparent resin. With respect to the variety of the dye or pigment to be employed, one with desired tone is appropriately selected. For example, a white tone pigment component can be selected from among dyes and pigments containing titanium oxide and zinc oxide, a red tone component from among dyes and pigments containing Indian red (ferric oxide), and a green tone component from among dyes and pigments containing chromium oxide.

The minute irregularities 64 can be formed by conducting a mat finishing by monolithic molding.

For example, the minute irregularities 64 can be formed by a method in which a fine pattern finishing or mat finishing by honing is applied onto an upper surface side of an injection molding die and injection molding is conducted into a predetermined dimension, for example, 300 to 50 µm thickness, or a method in which injection molding is first conducted and, thereafter, a mat finishing or fine patterning is applied by machining or chemical processing such as etching.

It is preferred that mirror polishing (specular finishing) by, for example, buffing be applied to surface 62b of the indicating plate substrate 62 on its side of solar cell 61 in order to prevent incident light transmitted through the indicating plate substrate 62 and heading toward the solar cell from undergoing irregular reflection at the interface of the indicating plate substrate 62 and the solar cell to thereby cause such a diffusion that power generating capability of the solar cell is deteriorated.

In the thus constructed indicating plate for solar watch B according to the sixth embodiment, the dye or pigment of the indicating plate substrate 62 functions as a coloring agent, and the minute irregularities 64 formed on the light-incidentside surface 62a of the indicating plate substrate 62 possess light diffusing function.

That is, light C4 incident from outside upon the indicating plate for solar watch B is divided into light having a wavelength within such a range that the light is absorbed by the dye or pigment of the indicating plate substrate 62 and light having a wavelength within such a range that the light is scattered by the minute irregularities 64 formed on the light-incident-side surface 62a of the indicating plate substrate 62.

Portion D4 of the light scattered by the minute irregularities 64 heads upward to reach the eyes of viewer. Thus, the viewer sees the indicating plate substrate 62 and recognizes the tone possessed by the dye or pigment of the indicating plate substrate 62 as the indicating plate B. That is, light of the wavelength range of color of the same series as the tone of the dye or pigment of the indicating plate substrate 62 is scattered by the irregularities 64 to thereby reach the eyes of viewer. The tone of dye or pigment of indicating plate substrate 62 recognized by the viewer beautifies the appearance of the indicating plate structure for solar watch A.

Portion E4 of the light scattered by the irregularities 64 heads downward, passes through the indicating plate substrate 62 and reaches the underlying solar cell 61 to thereby contribute to power generation thereof. In this instance, portion F4 of the light E4 incident upon the solar cell 61 is reflected upward by the solar cell 61. If the reflected light passes through the indicating plate for solar watch B and reaches the eyes of viewer, the solar cell 61 is perceived by the viewer. However, portion of the light F4 having been reflected upward by the solar cell 61 is absorbed by the dye or pigment of the indicating plate substrate 62, so that no problem arises. That is, the rest of reflected light F4 having not been absorbed by the dye or pigment of the indicating plate substrate 62 is scattered by the irregularities 64. Portion of the scattered light heads upward to thereby reach the eyes of viewer. However, the amount thereof is extremely small as compared with that of the entirety of the reflected light F4, so that there is scarcely any probability of the solar cell 61 being perceived by the viewer.

With respect to the insulating band cross lines crosswise arranged between solar cells 61 as well, there is scarcely any probability of being perceived by the viewer by virtue of the same effect as described above.

Thus, the indicating plate substrate 62 contains the dye or pigment and the minute irregularities 64 capable of light diffusion are provided on the light-incident-side surface of the indicating plate substrate 62, so that the brown or dark-blue solar cells 61 and insulating band cross lines are not viewed through the indicating plate and a design variation inclusive of tone exhibited by the dye or pigment is extensively increased to thereby enhance an appearance quality and, thus, enhance a commercial value.

Figure 10:
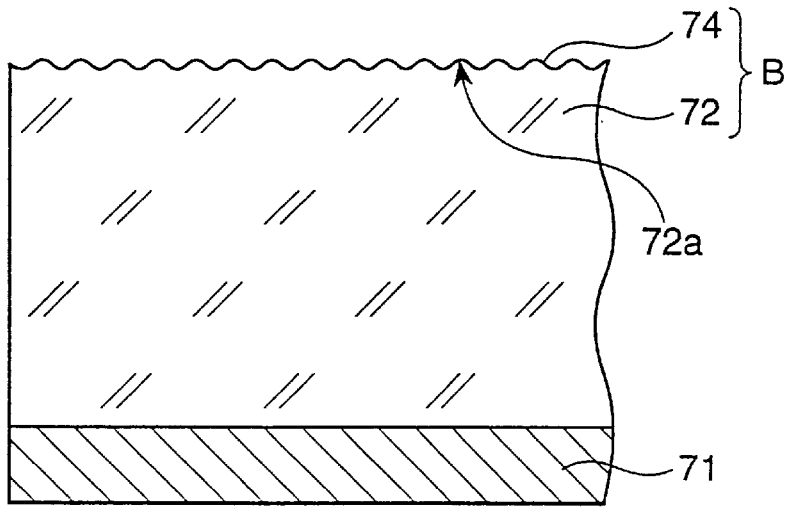
FIG. 10 is a sectional view of the indicating plate for solar watch according to the seventh embodiment of the present invention.

FIG. 10 is a sectional view of the indicating plate for solar watch according to the seventh embodiment of the present invention.

The construction of the indicating plate B for solar watch according to the seventh embodiment is the same as that of the sixth embodiment except that the indicating plate substrate 72 is composed of a transparent resin containing not only a dye or pigment as a coloring agent but also a light diffusing agent.

The indicating plate for solar watch B according to the seventh embodiment comprises indicating plate substrate 72 composed of a transparent resin containing a dye or pigment as a coloring agent and further a light diffusing agent, the above indicating plate substrate 72 having minute irregularities 74 capable of light diffusion formed on its light-incident-side surface 72a.

The indicating plate substrate 72 can be produced by mixing a light diffusing agent and a dye or pigment in a transparent resin such as an acrylic resin or a polycarbonate (polycarbonic ester) resin, pelletizing the mixture and forming the pellets into a predetermined dimension, for example, 300 to 500 $\mu$m thickness by injection molding. The mixing ratio of the light diffusing agent and the dye or pigment can appropriately be decided taking the tone and light transmission into account. When the amount of light diffusing agent and dye or pigment is too large, the light transmission is likely to be poor. On the other hand, when the amount of these is too small, the solar cell lying under the indicating plate is likely to be viewed through the indicating plate unfavorably from the viewpoint of appearance quality. Taking these into consideration, the dye or pigment is used in an amount of 0.5 to 10% by weight, preferably, 1 to 7% by weight and, still preferably, 2 to 5% by weight based on transparent resin. Also, the light diffusing agent is used in an amount of 0.5 to 10% by weight, preferably, 1 to 7% by eight and, still preferably, 2 to 5% by weight based on transparent resin.

As for the above light diffusing agent, for example, any of powdery silicic acid, powdery calcium carbonate and powdery calcium phosphate can be used. From the viewpoint of desired diffusion effect, it is preferred that the particle size thereof range from 5 to 15 $\mu$m, especially, about 8 to 12 $\mu$m. The same variety of dye or pigment as employed in the sixth embodiment can be used, and the formation of irregularities 74, etc. can be performed in the same manner as in the sixth embodiment.

In the thus constructed indicating plate for solar watch B according to the seventh embodiment, the dye or pigment of the indicating plate substrate 72 functions as a coloring agent, the light diffusing agent of the indicating plate substrate 72 exerts a light diffusing effect, and the minute irregularities 74 formed on the light-incident-side surface 72a of the indicating plate substrate 72 possess a light diffusing function.

Thus, more effectively than in the sixth embodiment, the brown or dark-blue solar cells 71 and insulating band cross lines are not viewed through the indicating plate and a design variation inclusive of tone exhibited by the dye or pigment is extensively increased to thereby enhance an appearance quality and, thus, enhance a commercial value, by virtue of the light diffusing effect of the light diffusing agent of the indicating plate substrate 72.

Figure 11:
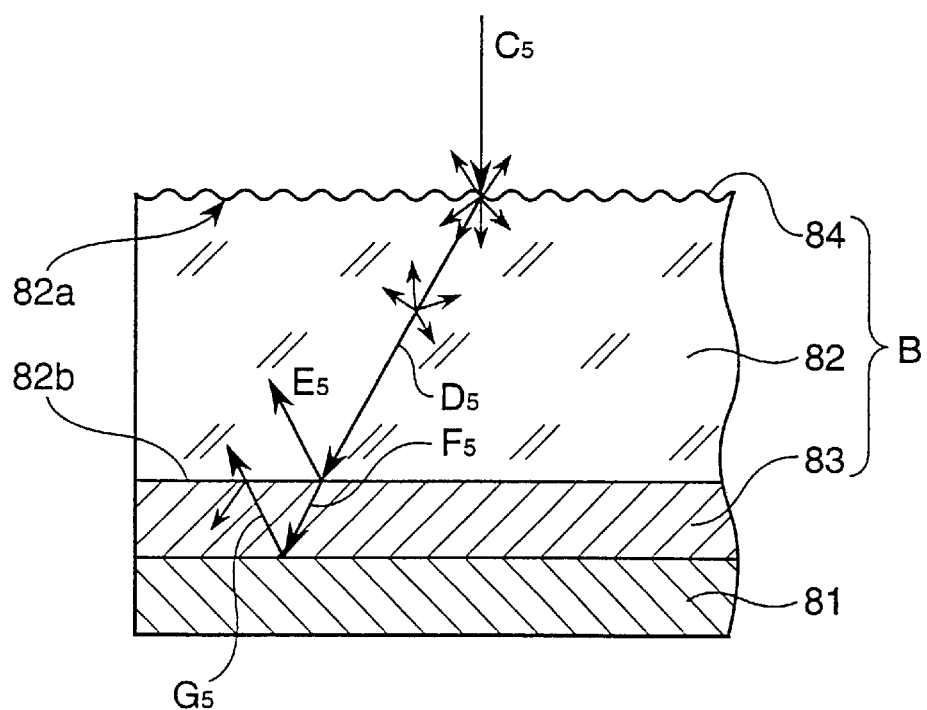
FIG. 11 is a sectional view of the indicating plate for solar watch according to the eighth embodiment of the present invention.

FIG. 11 is a sectional view of the indicating plate for solar watch according to the eighth embodiment of the present invention.

This indicating plate for solar watch B according to the eighth embodiment comprises indicating plate substrate 82 composed of a transparent resin containing a light diffusing agent and reflecting layer 83 formed on solar-cell-side back surface 82b of the indicating plate substrate 82, the indicating plate substrate 82 having minute irregularities 84 as a light diffusing working formed on its light-incident-side surface 82a.

The indicating plate substrate 82 can be produced by mixing a light diffusing agent in a transparent resin such as an acrylic resin or a polycarbonate (polycarbonic ester) resin, pelletizing the mixture and forming the pellets into a predetermined dimension, for example, 300 to 500 $\mu$m thickness by injection molding.

The mixing ratio of the light diffusing agent can appropriately be decided taking the tone and light transmission into account. When the amount of light diffusing agent is too large, the light transmission is likely to be poor. On the other hand, when the amount of light diffusing agent thereof is too small, the solar cell lying under the indicating plate is likely to be viewed through the indicating plate unfavorably from the viewpoint of appearance quality. Taking these into consideration, the light diffusing agent is used in an amount of 0.5 to 10% by weight, preferably, 1 to 7% by weight and, still preferably, 2 to 5% by weight based on transparent resin. As the above light diffusing agent, for example, any of powdery silicic acid, powdery calcium carbonate and powdery calcium phosphate can be utilized. From the viewpoint of desired diffusion effect, it is preferred that the particle size thereof range from 5 to 15 μm, especially, about 8 to 12 μm.

When the light diffusing agent is mixed in the transparent resin, the transparent resin exhibits milky tone. The greater the amount of light diffusing agent, the deeper the milky tone and the higher the light diffusing efficiency to thereby lower the transmission factor. The light diffusing agent is to be added in a relatively small amount as mentioned above in order to breed a delicate hue of the milky tone of the light diffusing agent of the indicating plate substrate 82 mixed with a metallic tone of the reflecting layer 83 formed on the solar-cell-side back surface 82b of the indicating plate substrate 82.

The minute irregularities 84 can be formed by conducting a mat finishing by monolithic molding. For example, the minute irregularities 84 can be formed by a method in which a fine pattern finishing or mat finishing by honing is applied onto an upper surface side of an injection molding die and injection molding is conducted into a predetermined dimension, for example, 300 to 50 μm thickness, or a method in which injection molding is first conducted and, thereafter, a mat finishing or fine patterning is applied by machining or chemical processing such as etching. In this embodiment, the light diffusing agent is mixed in the indicating plate substrate 82, so that, when the light diffusing effect thereof is satisfactory, the minute irregularities 84 can be omitted.

The reflecting layer 83 can be provided by forming a metal coating as extremely thin as, for example, 1000 to 3000 Å, preferably, 1500 to 2500 Å on the solar-cell-side back surface 82b of the indicating plate substrate 82 with the use of a metal with high light reflectance such as chromium, nickel, aluminum, palladium, rhodium or platinum by common technique such as vapor deposition, ion plating or other dry plating. This reflecting layer 83 is a thin film capable of reflecting portion of light, absorbing another portion of light and transmitting the rest of light. The reflecting layer 83 may be a monolayer film obtained by vapor deposition of a single metal or a multilayer film obtained by vapor deposition of several types of metals in conformity with desired tone.

In the thus constructed indicating plate for solar watch B according to the eighth embodiment, the light diffusing agent of the indicating plate substrate 82 and the minute irregularities 84 formed on the light-incident-side surface 82a of the indicating plate substrate 82 possess light diffusing function, and the light diffusing agent (milky color) of the indicating plate substrate 82 and the reflecting layer 83 function as a coloring agent.

That is, incident light C5 is scattered by the minute irregularities 84 and the light diffusing agent of the indicating plate substrate 82. Among light D5 having been transmitted downward through the indicating plate substrate 82, light of the wavelength of color of a series different from the tone of the reflecting layer 83 is absorbed by the reflecting layer 83. Light of the wavelength of color of the same series as the tone of the reflecting layer 83 has its portion E5 reflected upward by the reflecting layer 83 while the rest of light F5 is transmitted through the reflecting layer 83 to thereby reach the solar cell 81. Portion of the light having reached the solar cell 81 contributes to power generation of the solar cell 81 while the rest of light G5 is reflected toward the surface. This is because the reflecting layer 83 is an extremely thin film, so that it is capable of transmitting portion of light while reflecting the rest of light.

On the other hand, light E5 having been reflected by the reflecting layer 83 is scattered by the light diffusing agent of the indicating plate substrate 82 and also scattered by the minute irregularities 84 and heads upward to thereby reach the eyes of viewer. Thus, the viewer perceives the indicating plate substrate 82 and recognizes as the indicating plate B a delicate hue of the milky tone of the light diffusing agent of the indicating plate substrate 82 mixed with the tone of the reflecting layer 83.

Light G5 having been reflected by the solar cell 81 reaches the reflecting layer 83 once more. Portion thereof is reflected to return to the solar cell 81, and the rest is transmitted through the reflecting layer 83. If this light passes through the indicating plate for solar watch B and reaches the eyes of viewer, the viewer perceives the solar cell 81. However, the light having been reflected upward by the solar cell 81 and having passed through the reflecting layer 83 is scattered by the light diffusing agent of the indicating plate substrate 82 and the irregularities 84. Although portion of the scattered light heads upward and reaches the eyes of the viewer, the amount thereof is extremely small as compared with that of the entirety of the reflected light, so that there is scarcely any probability of the solar cell 81 being perceived by the viewer.

With respect to the insulating band cross lines crosswise arranged between solar cells 81 as well, there is scarcely any probability of being perceived by the viewer by virtue of the same effect as described above. As apparent from the above, the indicating plate substrate 82 contains the light diffusing agent, and the minute irregularities 84 capable of light diffusion are provided on the light-incident-side surface of the indicating plate substrate 62. Furthermore, the reflecting layer 83 capable of reflecting portion of light, absorbing another portion of light and transmitting the rest of light is disposed on the back of the indicating plate substrate 82. Therefore, the brown or dark-blue solar cells 81 and insulating band cross lines are not viewed through the indicating plate and a design variation inclusive of tone is extensively increased by the tone of the reflecting layer 83 and the light diffusing agent of the indicating plate substrate 82 to thereby enhance an appearance quality and, thus, enhance a commercial value.

Figure 12:
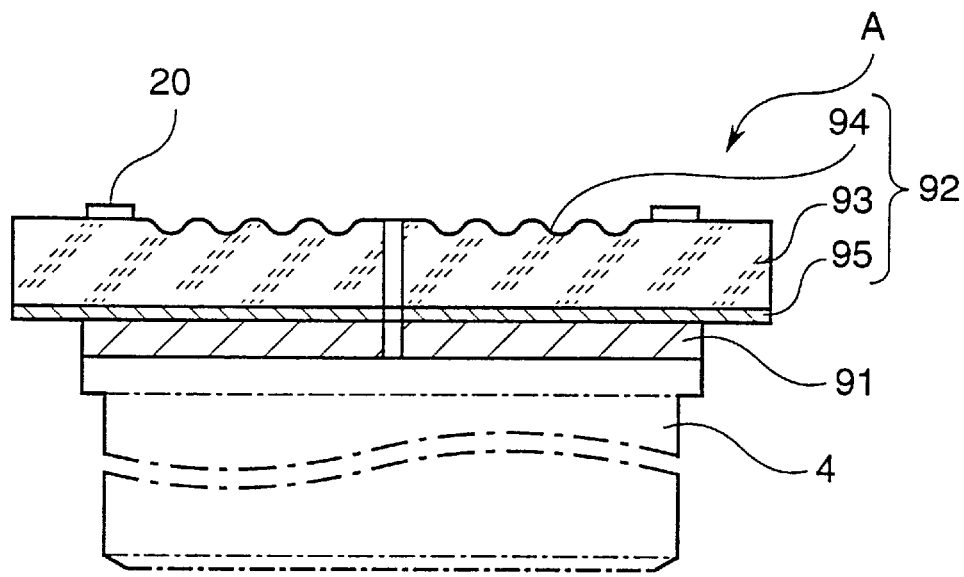
FIG. 12 is a sectional view of an indicating plate structure for solar watch equipped with the indicating plate for solar watch according to the ninth embodiment of the present invention.
Figure 13:
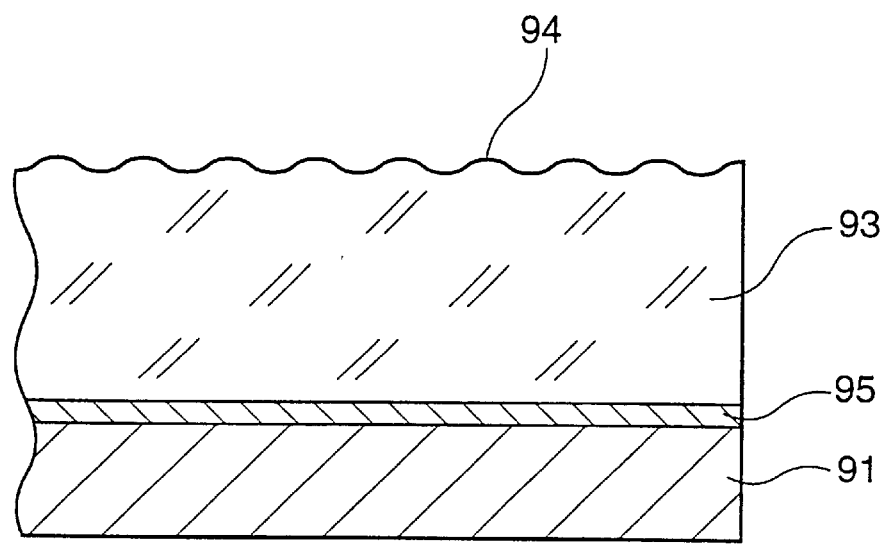
FIG. 13 is a sectional view of the indicating plate for solar watch shown in FIG. 12.
Figure 14:
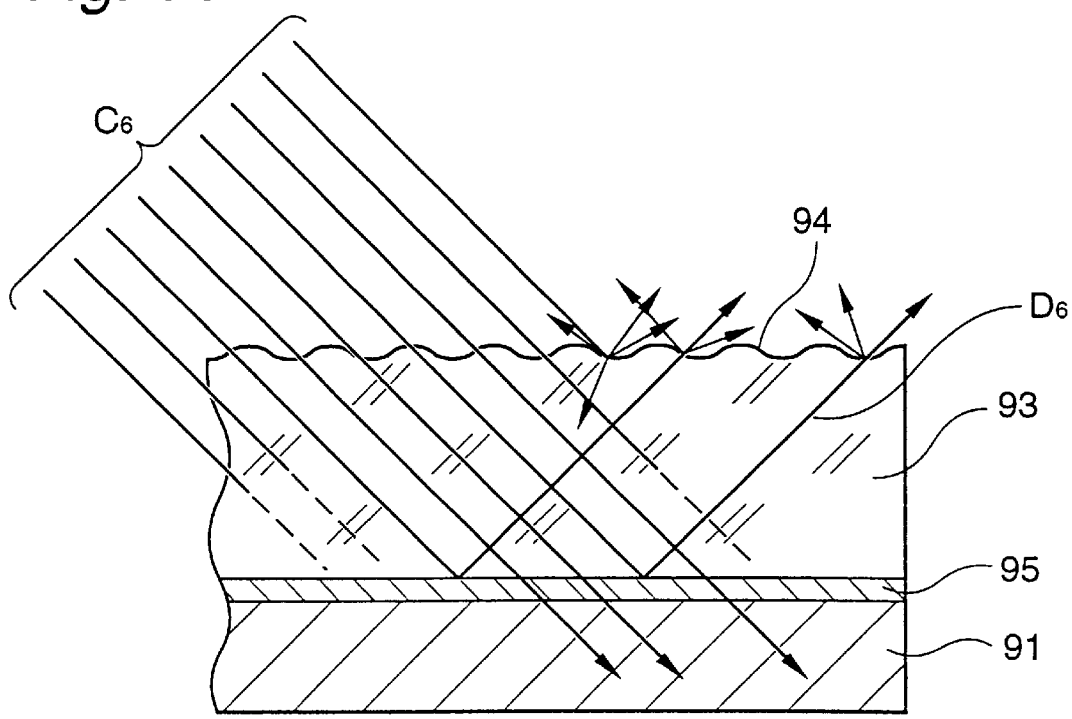
FIG. 14 is an explanatory view of incidence and emission of light on the indicating plate for solar watch of FIG. 12.

FIG. 12 is a sectional view of an indicating plate structure for solar watch equipped with the indicating plate for solar watch according to the ninth embodiment of the present invention. FIG. 13 is a sectional view of the indicating plate for solar watch shown in FIG. 12. FIG. 14 is an explanatory view of incidence and emission of light on the indicating plate for solar watch of FIG. 12.

The indicating plate for solar watch 92 comprises colored translucent substrate 93, pattern layer 94 disposed on a front side of the colored translucent layer 93 and a colored thin film layer, particularly, colored metallized layer 95 disposed on a back side of the colored translucent substrate 93. Surface of the pattern layer 94 is provided with time characters 20 by bonding or printing.

Same as shown in FIG. 36 for the prior art, the solar cell 91 is fan-shaped in plan form, and four solar cells 91 are arranged with insulating bands interposed therebetween. The above colored translucent substrate 93 is obtained by, in the process of forming a transparent substrate from a starting material such as a transparent polycarbonate or acrylic resin, mixing any of various pigments or dyes in the starting material, pelletizing the mixture and subjecting the pellets to injection molding.

The metallized layer 95 is a colored thin film layer whose thickness ranges from about 500 to 5000 Å. It is known in the art that thin films with various tones can be obtained by vapor deposition of various metals such as Au, Cr, Al, Pt, Ni, Pd and Rh and the like. The metallized layer 95 is also formed as a thin film with variable tone by the common process. The metallized layer 95 is a monolayer film obtained by vapor deposition of a single species of metal. The metallized layer 95 has a thickness of, preferably, 2500 to 3500 Å and, optimally, 2000 to 3000 Å. In particular, when the metallized layer 95 is a layer produced by vapor deposition of Cr, the tone thereof is gray and a light transmission factor of at least 50% at a 500 nm wavelength region can be ensured.

The light transmission factor is generally determined from the quantity of power generated by the solar cell from light transmitted through a dial for solar cell watch. That is, the solar cell placed at a given distance from a light source in an apparatus constructed so as to inhibit penetration of external light is irradiated with light to convert light energy to electric energy, thereby obtaining electric current designated $A_0$. A dial for solar cell watch is mounted on the above solar cell, and the same measurement is carried out, thereby obtaining electric current designated $A_1$. The light transmission factor is expressed as a percentage of $A_1$ to $A_0$ (same in the following embodiments). It is recognized that, if the indicating plate structure for solar watch A exhibits a light transmission factor of at least 50%, power can be generated without any disadvantage in the ordinary carrying on the wrist.

The action of the thus constructed indicating plate structure for solar watch A will be described below. As mentioned in the prior art section, the solar cell 91 is generally brown or dark-blue, so that the indicating plate is brown or dark-blue. Further, there are insulating bands between solar cells 91, so that the insulating bands appear as a cross line. However, a delicate hue is ensured by the colored translucent substrate 93 and the metallized layer 95 as colored thin film layer in the present invention with the result that the brown or dark-blue solar cell 91 and insulating band cross line are put out of sight.

As shown in FIG. 14, among light C6 incident upon the colored translucent substrate 93, light of a wavelength region of a series different from the color of the colored translucent substrate 93 is absorbed by the colored translucent substrate 93. Portion II of light of a wavelength region of the same series as the color of the colored translucent substrate 93 has transmitted through the metallized layer 95 to reach the solar cell 91. Thus, the light contributes to generation of power while the rest of light is reflected toward the surface. This is because the metallized layer 95 is an extremely thin film, so that it is capable of transmitting portion of light while reflecting the rest of light. An extremely small amount of light among the light transmitted through the colored translucent substrate 93 is absorbed by the metallized layer 95 as well.

Light D6 having been reflected by the metallized layer 95 has directivity and is inhomogeneous. However, the light D6 is scattered by the pigment or dye mixed in the colored translucent substrate 93 and the pattern layer 94 to thereby reach the eyes of viewer. Therefore, the viewer perceives the pattern layer 94 together with delicate hue of a combination of the color of the colored translucent substrate 93 as a base with the color of the metallized layer 95 homogeneously on the entire surface of the colored translucent substrate 93. As a result, the brown or dark-blue solar cell 91 and insulating band cross line are not viewed through the indicating plate.

Therefore, designing can be diversified to thereby realize the same design expression as made in the conventional indicating plate. Thus, not only is a design variation inclusive of a tone and pattern imparting a high-grade feeling markedly increased but also a delicate hue can be provided so that the appearance quality is enhanced to thereby contribute to an increase of commercial value.

The method of forming the colored thin film layer is not limited to vapor deposition of metals, and the colored thin film layer can be formed by dry plating such as ion plating or sputtering.

Figure 15:
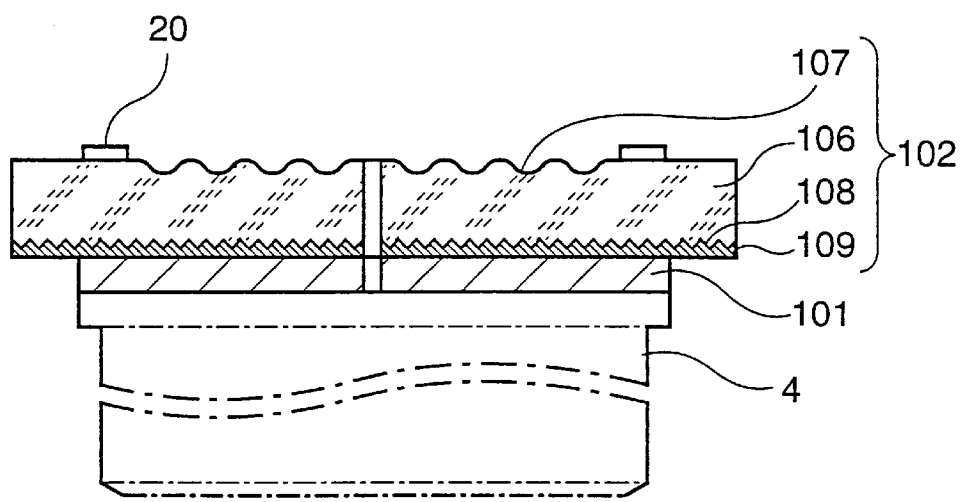
FIG. 15 is a sectional view of an indicating plate structure for solar watch equipped with the indicating plate for solar watch according to the tenth embodiment of the present invention.
Figure 16:
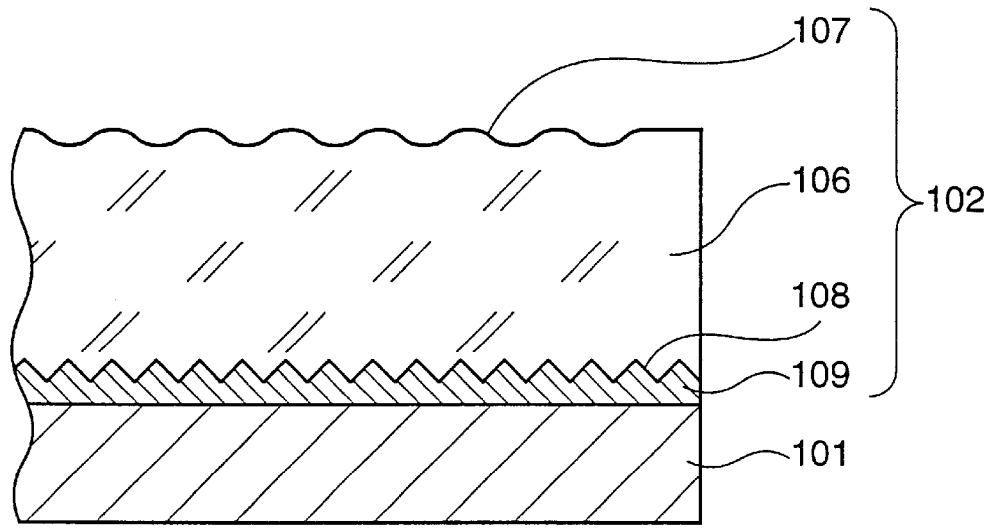
FIG. 16 is a partially curtailed sectional view of the indicating plate for solar watch of FIG. 15.
Figure 17:
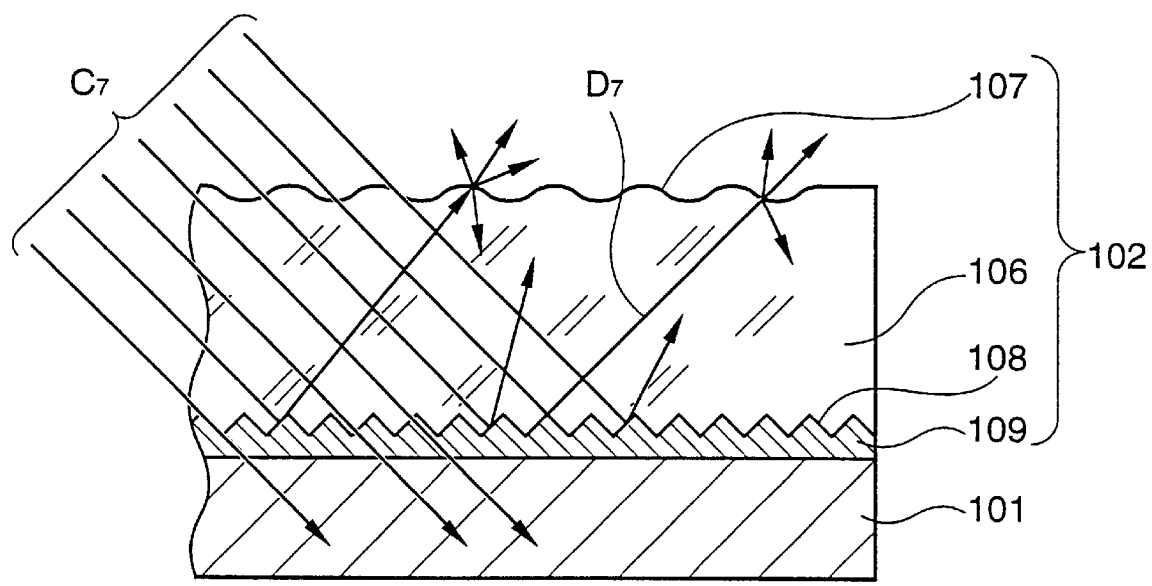
FIG. 17 is an explanatory view of incidence and emission of light on the indicating plate for solar watch of FIG. 16.

FIG. 15 is a sectional view of an indicating plate structure for solar watch equipped with the indicating plate for solar watch according to the tenth embodiment of the present invention. FIG. 16 is a partially curtailed sectional view of the indicating plate for solar watch of FIG. 15. FIG. 17 is an explanatory view of incidence and emission of light on the indicating plate for solar watch of FIG. 16.

In the indicating plate structure for solar watch A according to this embodiment, the indicating plate for solar watch 102 comprises transparent substrate 106, pattern layer 107 disposed on a front side of the transparent substrate 106, diffusion layer 108 disposed on a back side of the transparent substrate 106 and a colored thin film layer, especially, metallized layer 109 disposed on the diffusion layer 108.

Solar cell 101 is disposed on a front side of module 4 mentioned above. The indicating plate for solar watch 102 with its pattern layer 107 directed toward the front side is arranged on a surface of the solar cell 101. As in the ninth embodiment, the front side of the pattern layer 107 is provided with time characters 20 by bonding or printing.

The transparent substrate 106 is formed by injection molding. Molding die is provided in advance with a pattern die part for forming irregularities of the pattern of the pattern layer 107 and an irregularity die part for forming random minute irregularities of the diffusion layer 108. Therefore, in the injection molding of the transparent substrate 106, the pattern layer 107 and the diffusion layer 108 are formed at the top and the back side thereof, respectively. The pattern layer 107 is formed into, for example, Piazzi cut or glory-of-rising-sun pattern.

As in the ninth embodiment, the metallized layer 109 is a colored thin film layer whose thickness ranges from about 500 to 5000 Å. It is known in the art that thin films with various tones can be obtained by vapor deposition of various metals such as Au, Cr, Al, Pt, Ni, Pd and Rh and the like. The metallized layer 109 is also formed as a thin film with variable tone by the common process. The metallized layer 109 is a monolayer film obtained by vapor deposition of a single species of metal. The metallized layer 109 has a thickness of, preferably, 2500 to 3500 Å and, optimally, 2000 to 3000 Å. In particular, when the metallized layer 109 is a layer produced by vapor deposition of Cr, the tone thereof is gray and a light transmission factor of at least 50% at a 500 nm wavelength region can be ensured.

The action of the thus constructed indicating plate structure for solar watch A according to the ninth embodiment will be described below.

Referring to FIG. 17, portion of the light C7 incident upon the transparent substrate 106 is transmitted through the diffusion layer 108 and the metallized layer 109 to reach the solar cell 101 where the light contributes to generation of power. The rest of light is diffused and reflected toward the surface by the metallized layer 109 and the diffusion layer 108 formed on the back of the transparent substrate 106. This is because the metallized layer 109 is an extremely thin film, so that it is capable of transmitting portion of light while reflecting the rest of light. Light D7 having been diffused and reflected by the diffusion layer 108 and the metallized layer 109 has directivity and is inhomogeneous. However, the light D7 is further diffused (scattered) by the pattern layer 107 formed on the surface of the transparent substrate 106. Therefore, the viewer perceives the pattern layer 107 together with the color of the metallized layer 109, namely, metallic color homogeneously on the entire surface of the transparent substrate 106. As a result, the brown or dark-blue solar cell 101 and insulating band cross line are not viewed through the indicating plate. An extremely small portion of transmitted light is absorbed by the metallized layer 109.

Therefore, designing can be diversified to thereby realize the same design expression as made in the conventional indicating plate. Thus, not only is a design variation inclusive of a tone and pattern imparting a high-grade feeling markedly increased but also a delicate hue can be provided so that the appearance quality is enhanced to thereby contribute to an increase of commercial value.

The method of forming the colored thin film layer is not limited to vapor deposition of metals, and the colored thin film layer can be formed by dry plating such as ion plating or sputtering.

Figure 18:
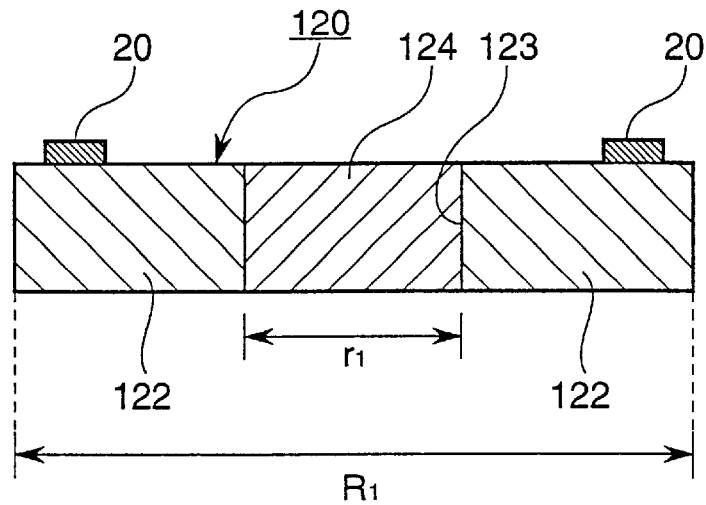
FIG. 18 is a sectional view of the indicating plate for watch according to the eleventh embodiment of the present invention.
Figure 19:
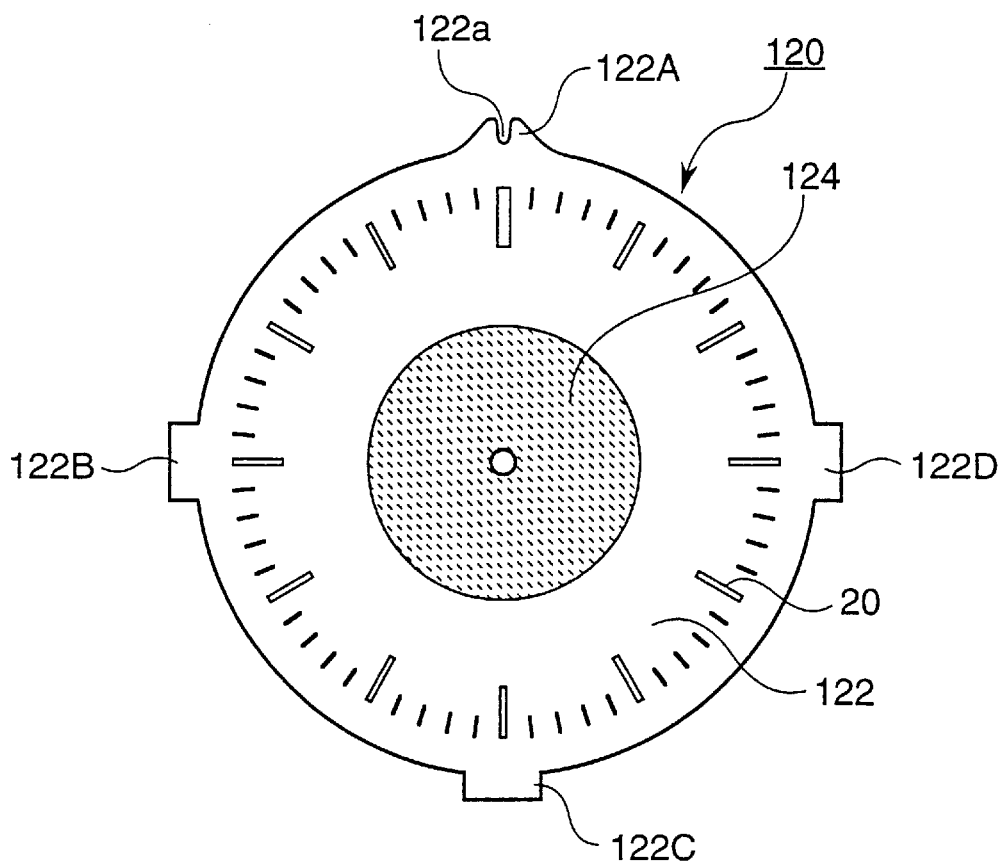
FIG. 19 is a plan view of the indicating plate for watch according to the eleventh embodiment of the present invention.

FIG. 18 is a sectional view of the indicating plate for watch according to the eleventh embodiment of the present invention. FIG. 19 is a plan view of the indicating plate for watch according to the eleventh embodiment of the present invention.

Referring to FIG. 18, the indicating plate for watch 120 according to this embodiment comprises peripheral-side member 122 with a circular ring shape, the peripheral-side member 122 provided with circular central opening 123, and disk-shaped inner-boundary-side member 124 fitted in the circular central opening 123. Preselected prints and time characters 20 are formed on an upper surface of the peripheral-side member 122 or the inner-boundary-side member 124 by, for example, printing, coating or plating. The inner-boundary-side member 124 is fitted in the central opening 123 of the peripheral-side member 122 by the use of an epoxy adhesive, an acrylic adhesive, a urethane adhesive, an adhesive comprising a resin obtained by modifying these resins, or an ultraviolet curable adhesive comprising, for example, a UV curable acrylic resin, a UV curable urethane resin or a UV curable epoxy resin. Although not shown, a center hole corresponding to the above-mentioned central hole A1 is disposed in the center of the inner-boundary-side member 124.

Although the dimension of the indicating plate for watch 120 is to be decided depending on the size of the watch and is not particularly limited, it is preferred that, as for wristwatches, the diameter range from 10 to 35 mm with the shape either circular or deformed (e.g., rectangular, etc.) and that the thickness range from 200 to 500 μm so that, as described later, the transmission of light contributing to power generation is in the range of 10 to 60%. Moreover, the proportion in size of the peripheral-side member 122 to the inner-boundary-side member 124 depends on the relationship of arrangement of prints and time characters 20, the design, the above light transmission factor, etc. and is not particularly limited. However, it is preferred that the outside diameter R1 of the peripheral-side member 122 range from 1.5 to 3.0 times the outside diameter r1 of the inner-boundary-side member 124. For example, the outside diameter R1 of the peripheral-side member 122 and the outside diameter r1 of the inner-boundary-side member 124 can be 30 mm and 12 mm, respectively.

As a constituent of the peripheral-side member 122 and the inner-boundary-side member 124, use can be made of a natural material, for example:

(1) precious stone such as sapphire, blue pearl, onyx or tiger's-eye, (2) shell such as white pearl oyster shell, (3) glass, or (4) ceramic such as $Al_2O_3$, or a synthetic material, for example:

(5) metal such as titanium, SUS 304 or other stainless steel, or brass, german silver or other copper alloy, or (6) plastic such as polycarbonate or polyacetal resin (e.g., Duracon (trade name) produced by Polyplastics Co., Ltd. or Delrin (trade name) produced by Du Pont). These can be appropriately combined so that the peripheral-side member 122 and the inner-boundary-side member 124 are composed of materials different from each other.

Figure 20:
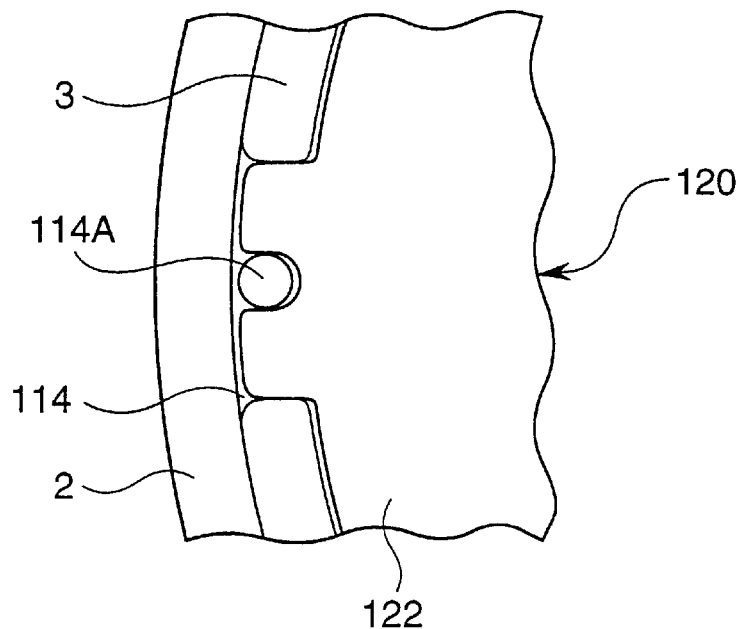
FIG. 20 is a sectional view explaining a state in which the indicating plate for watch according to the eleventh embodiment of the present invention is fixed.

When the peripheral-side member 122 is composed of a synthetic material such as a metal or a plastic, referring to FIG. 19, the peripheral-side member 122 is provided with a fixing part for fixing the indicating plate for watch 120 to a watch frame. That is, nearly rectangular protrusions 122A to 122D are formed at symmetrical positions of periphery of the peripheral-side member 122. These protrusions 122A to 122D are fitted in recesses 114 provided in an upper part of support frame 3, as shown in FIG. 20, so that desired fixing is attained. In this instance, the upper surface of the indicating plate for watch 120 and the upper surface of the support frame 3 lie on approximately the same plane. Front edge of protrusion 122A as one of the protrusions 122A to 122D is provided with notch 122a for positioning in this embodiment. This notch 122a is fitted to projecting part 114A for positioning provided in one of recesses 114 of the support frame 3, so that the positioning is attained.

Figure 21:
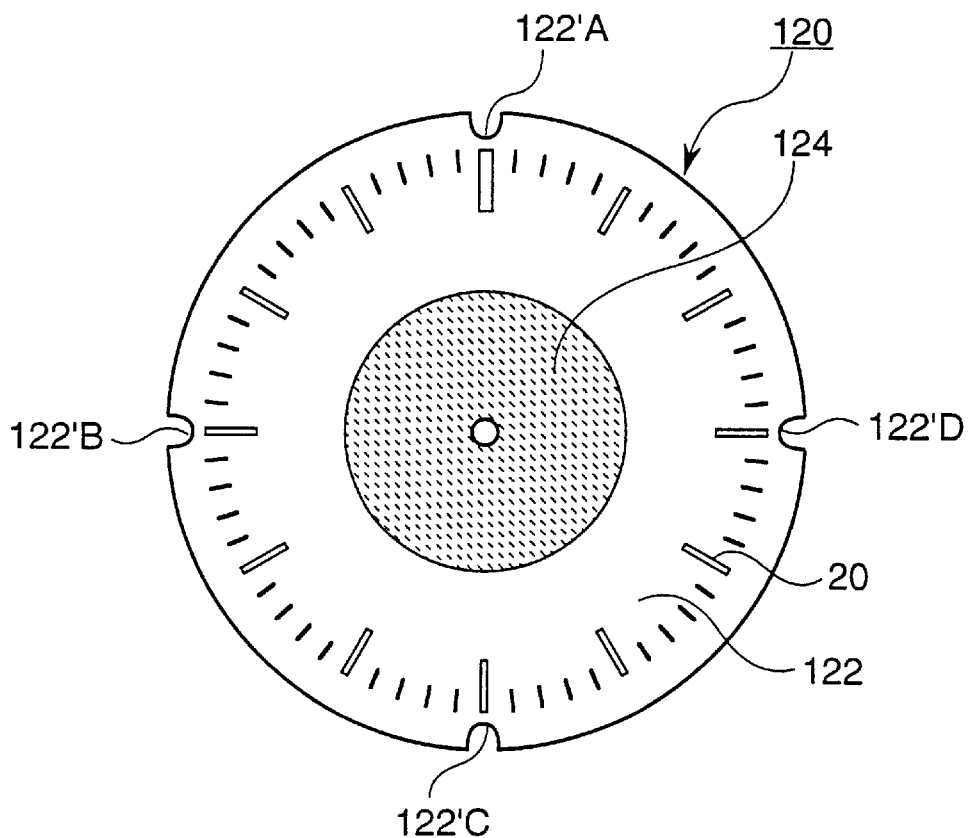
FIG. 21 is a plan view showing another form of fixing part of the indicating plate for watch according to the eleventh embodiment of the present invention.
Figure 22:
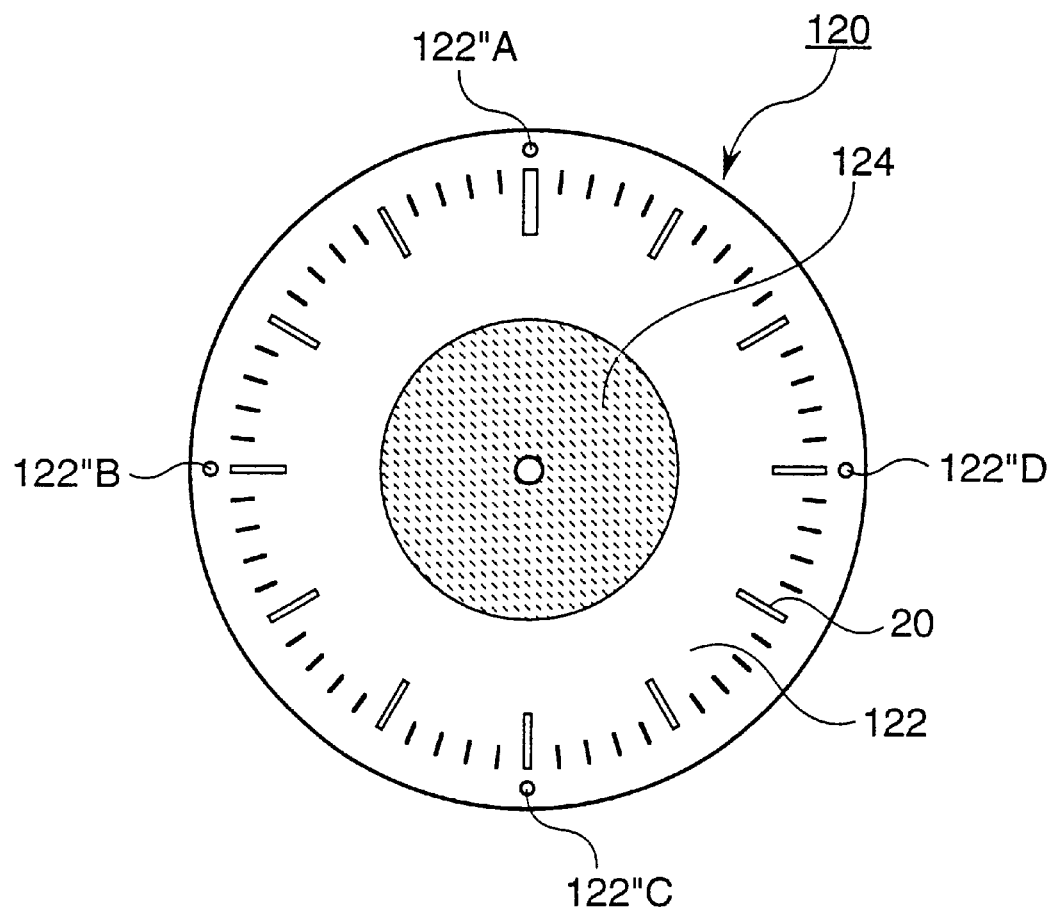
FIG. 22 is a plan view showing a further form of fixing part of the indicating plate for watch according to the eleventh embodiment of the present invention.

In place of the above protrusions 122A to 122D, the fixing of the indicating plate for watch 120 to the watch frame can be accomplished by such a construction that, referring to FIG. 21, nearly semicircular notches 122'A to 122'D are formed at symmetrical positions on periphery of the peripheral-side member 122, these notches 122'A to 122'D fitted to projecting parts (not shown) provided in corresponding relationship on the support frame 3 so that desired fixing is attained. Further, the fixing of the indicating plate for watch 120 to the watch frame can be accomplished by such a construction that, referring to FIG. 22, nearly circular holes 122"A to 122"D are formed at symmetrical positions in the vicinity of the periphery, these holes 122"A to 122"D are fitted to projecting parts (not shown) provided in corresponding relationship on the front side of module 4 so that desired fixing is attained. When either of the peripheral-side member 122 and the inner-boundary-side member 124 is composed of a metal, the fixing of the indicating plate for watch 120 to the watch frame can be accomplished by welding metal shaped into minute poles (commonly called "zodiac feet") to the back of the metal by spot welding to thereby form projections. These projections are fitted to recesses (not shown) provided in corresponding relationship on the front side of the module 4 so that desired fixing is attained. In this embodiment, although only one is selected from among the protrusion, notch and hole and used, at least two may be selected from among the same and used. Also, although four protrusions, notches or holes are arranged at symmetrical positions, the number thereof may be at least two in the present invention. In this instance, the protrusions, notches or holes may be arranged at asymmetrical positions.

Figure 23:
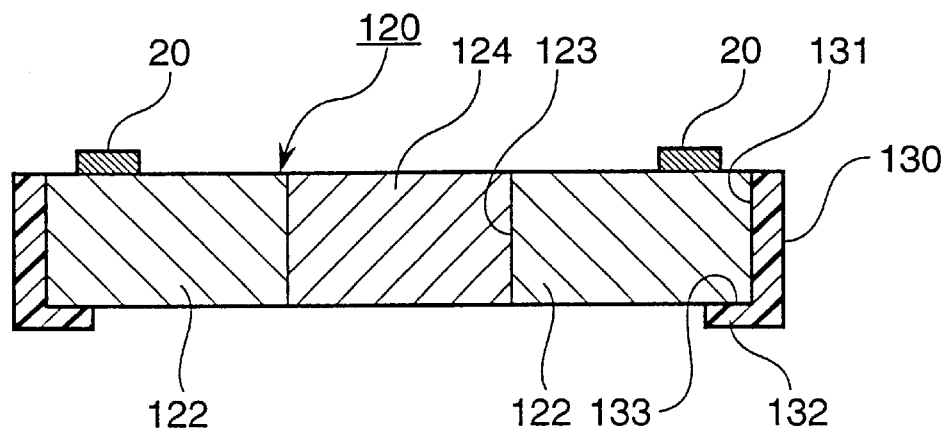
FIG. 23 is a sectional view showing another form of the indicating plate for watch according to the eleventh embodiment of the present invention.
Figure 23:
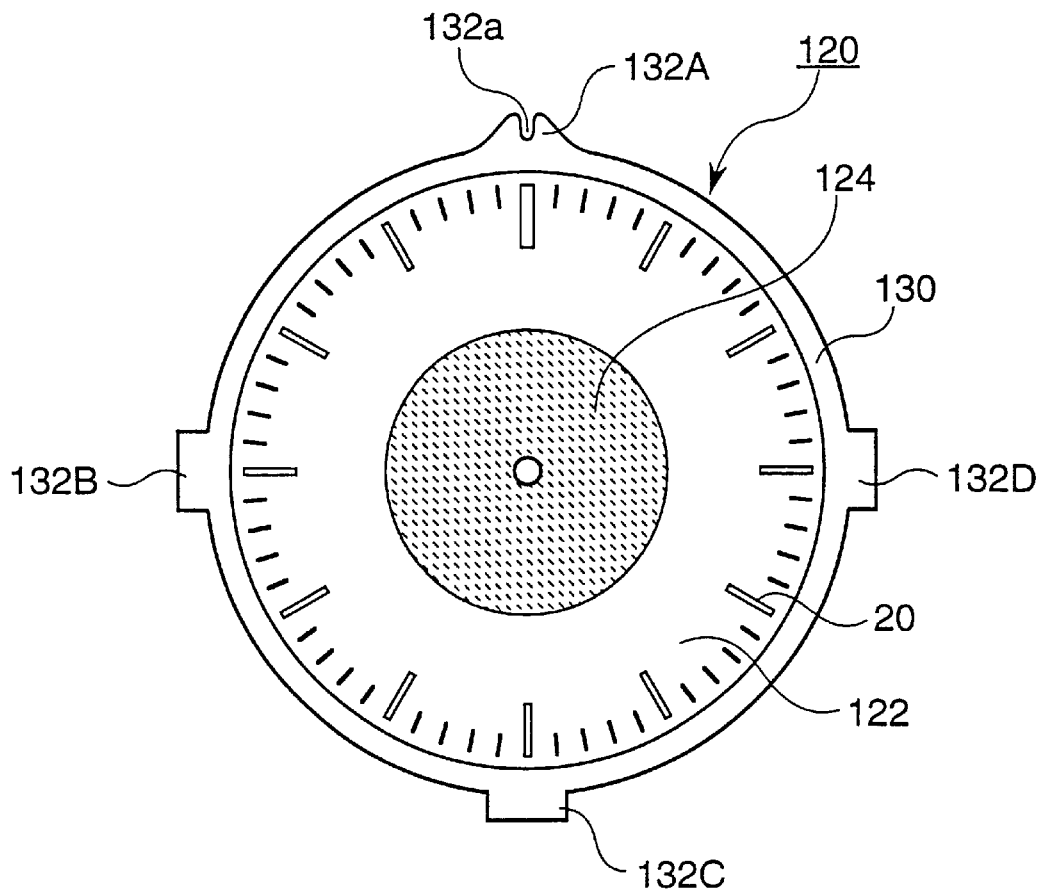

However, when a natural material such as a precious stone, a shell or a ceramic is used in the peripheral-side member 122, working for forming the above protrusion, notch, etc. is difficult and causes a cost increase. Thus, in this instance, the periphery of the peripheral-side member 122 is fitted with ringlike mounting member 130 composed of a metal or a plastic and provided with a fixing part for fixing the indicating plate to a watch frame, as shown in FIG. 23. That is, the back side of the mounting member 130 is provided with collar part 132 that is protrudent inward from a circumferential part of central opening 131 provided in the mounting member, the above central opening 131 and collar part 132 forming recess 133, in which the ringlike peripheral-side member 122 is fitted. The fitting of the periphery of the peripheral-side member 122 with the mounting member 130 is conducted by the use of an epoxy adhesive, an acrylic adhesive, a urethane adhesive, an adhesive comprising a resin obtained by modifying these resins, or an ultraviolet curable adhesive prepared therefrom.

Referring to FIG. 23(b), as the fixing part for fixing the indicating plate to a watch frame, nearly rectangular protrusions 132A to 132D are formed at symmetrical positions of periphery of the mounting member 130. These protrusions 132A to 132D are fitted in recesses 114 provided in an upper part of the support frame 3 in the same manner as shown in FIG. 20 so that desired fixing is attained. It is naturally feasible to construct the above fixing part with the use of the notch shown in FIG. 21, the circular hole shown in FIG. 22 or the projecting part formed by welding minute metal poles in the use of a metal.

Although the size of the mounting member 130 depends on the size of desired watch, it is preferred that, in a wristwatch, the ring width of the mounting member 130 range from 170 to 250 $\mu$m, the projecting width of the collar part 132 range from 700 to 750 $\mu$m and the thickness of the collar part 132 range from 100 to 200 $\mu$m. In this construction, a spacing corresponding to the thickness (100 to 200 $\mu$m) of the collar part 132 of the mounting member 130 is provided between the peripheral-side member 122 and inner-boundary-side member 124 and the module 4 arranged thereunder. Therefore, even if the module 4 is deformed, for example, at the time of impact, the influence of the deformation is avoided and the indicating plate for watch does not suffer from cracking or damaging. Thus, neither appearance nor product quality is deteriorated.

Although the peripheral-side member 122 is shaped into a circular ring and the inner-boundary-side member 124 into a disk in this embodiment, the inner-boundary-side member 124 can be shaped into a rectangular board, an elliptic board, etc. and the peripheral-side member 122 into a ring conforming to this configuration in accordance with the shape of the watch. Also, the configuration of the center hole 123 provided in the inner-boundary-side member 124 can be changed into an appropriate one other than circle conforming to the above configuration, taking a design variation into account. Needless to mention, it is feasible to employ a combination of the peripheral-side member 122 shaped into a rectangular (inclusive of square) board, an elliptic board, etc., not into the circular ring, with the inner-boundary-side member 124 shaped into a disk.

Figure 32:
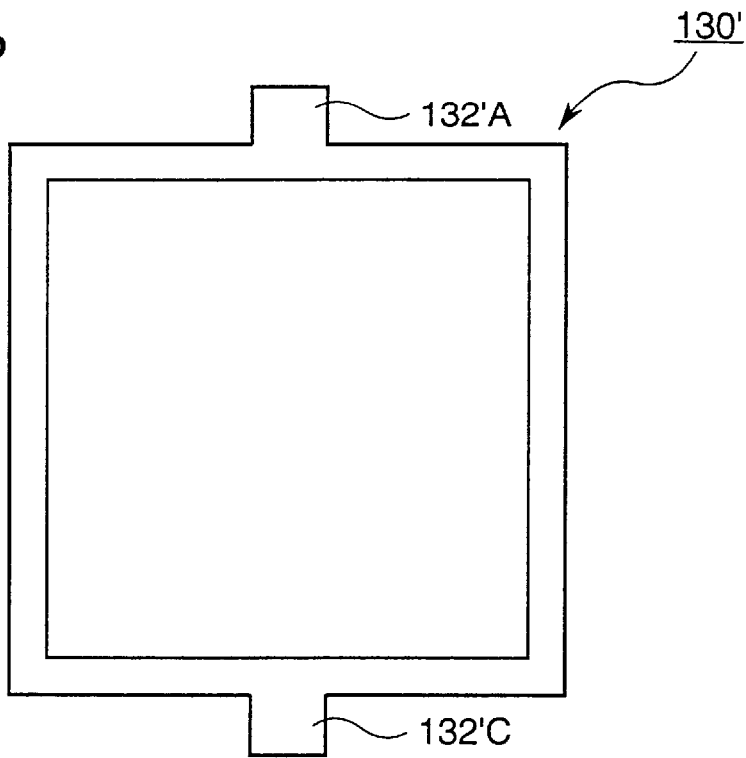
FIG. 32 is a sectional view showing another form of mounting member for indicating plate for watch according to the present invention.
Figure 33:
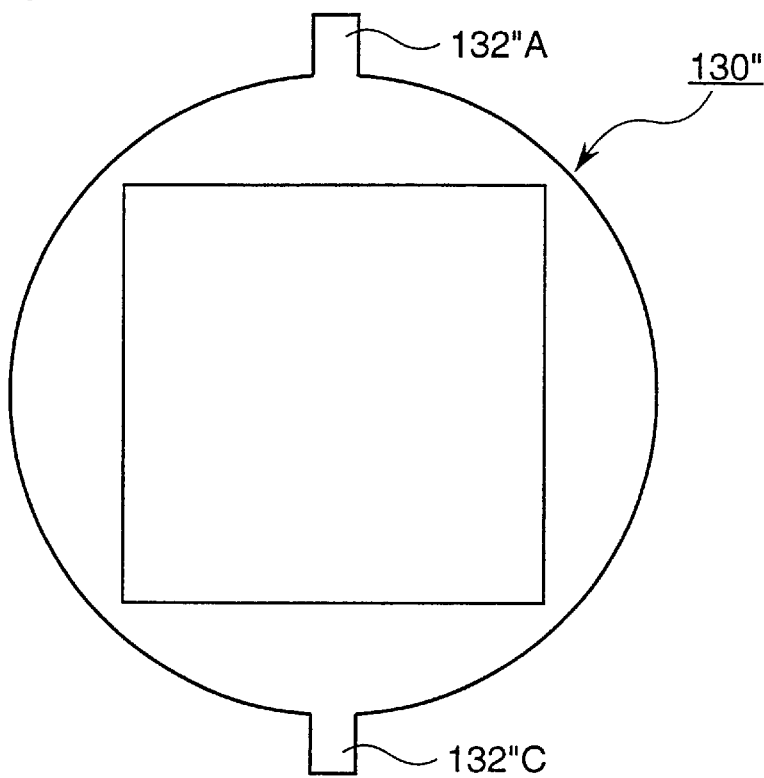
FIG. 33 is a sectional view showing a further form of mounting member for indicating plate for watch according to the present invention.

It is naturally feasible to use mounting member 130' shaped into a rectangular ring and having protrusions 132'A, 132'C as shown in FIG. 32 or mounting member 130" shaped into an elliptic ring and having protrusions 132"A, 132"C as shown in FIG. 33 as the mounting member 130, in place of that shaped into a circular ring as shown in FIG. 23(b).

In the indicating plate for watch 120 of the above construction, the material for forming the peripheral-side member 122 and the inner-boundary-side member 124 can appropriately be selected from among those of items (1) to (6) above and, further, the thickness thereof and the proportion in size of peripheral-side member 122 to inner-boundary-side member 124 can be decided so that the transmission of light contributing to power generation is in the range of 10 to 60%.

When the indicating plate for watch is used as that for solar watch, at least part of the indicating plate must be capable of transmitting light. Thus, an appropriate combination must be selected. From the viewpoint of light transmission, it is preferable to employ such a combination that the peripheral-side member 122 is composed of a ceramic or plastic while the inner-boundary-side member 124 is composed of a plastic or ceramic.

When, for example, an $Al_2O_3$ ceramic is used as a material for forming the peripheral-side member 122 or inner-boundary-side member 124, preferred use is made of one composed of $Al_2O_3$ having a purity of at least 99.90%, especially, at least 99.99% and exhibiting a light transmission factor of 20 to 60%, especially, 40 to 60%. The ceramic is preferred to have white tone from the viewpoint of light transmission. When the purity of $Al_2O_3$ is in the above range, lowering of light transmission attributed to absorption of light by impurities or coloring during the process of production can be avoided. On the other hand, when the light transmission is in the above range, not only can the color of the solar cell be effectively covered but also the supply of light energy to the solar cell is not hampered. Moreover, it is preferred that the surface roughness (Ra) measured by a tracer surface roughness meter be in the range of 0.01 to 2 $\mu$m, especially, 0.02 to 1 $\mu$m. When the surface roughness is less than 0.01 $\mu$m, the dial for solar cell watch has glossy white tone and the light transmission is lowered. On the other hand, when the surface roughness exceeds 2 $\mu$m, the amount of scattered light is increased to thereby result in deep white tone and lowering of light transmission. The above $Al_2O_3$ can be produced by mixing together $Al_2O_3$ having a purity of at least 99.90%, an organic binder such as polyvinyl alcohol or polyethylene oxide and water to thereby obtain an $Al_2O_3$ mixture, drying and granulating the $Al_2O_3$ mixture, shaping the granules into a plate dial precursor, firing the plate dial precursor at 700 to 1500° C. in an air atmosphere to thereby obtain a preliminary calcine and firing the preliminary calcine at 1500 to 1800° C. for 1 to 10 hr under a pressure of $1 \times 10^{-2}$ to $1 \times 10^{-5}$ torr.

The ceramic may have colored tone as long as the light transmission factor thereof is in the range of 20 to 60%. There are a method in which $Al_2O_3$ is doped with another metal oxide to thereby produce a colored member and a method in which a surface or back of ceramic is coated with a glaze to thereby produce a colored member. Although alumina ($Al_2O_3$) ceramic has been described, naturally, use can also be made of zirconia ceramic ($ZrO_2$, zirconia content: at least 80%).

When the peripheral-side member 122 or inner-boundary-side member 124 is a plastic, it is preferred that the plastic be composed of a transparent resin and treated with, for example, doped with at least one color diffusing agent selected from among a light diffusing agent, a light storing fluorescent material and a coloring agent composed of a dye or pigment. The reason is that not only are the insulating band cross lines and solar cell lying under the indicating plate not viewed through the indicating plate but also the indicating plate is colored to thereby increase a design variation inclusive of tone.

As the light diffusing agent, use can be made of, for example, any of powdery silicic acid, powdery calcium carbonate and powdery calcium phosphate. From the viewpoint of desired diffusion effect, it is preferred that the particle size thereof range from 5 to 15 $\mu$m, especially, about 8 to 12 $\mu$m.

A long persistent light storing fluorescent material is preferably used as the above light storing fluorescent material. In the use in a solar watch, it is preferred to employ a light storing fluorescent material exhibiting a high light transmission factor so that power generation of the solar cell is not prevented. It is further preferred that the light storing fluorescent material have a tone of superior quality and be brilliantly luminescent for a duration prolonged as much as possible in a dark environment.

As this light storing fluorescent material, use can be made of the above-mentioned light storing fluorescent materials such as green luminescent light storing fluorescent material disclosed in Japanese Patent Laid-open Publication No. 7(1995)-011250 and bluish-green luminescent light storing fluorescent material disclosed in U.S. Pat. No. 5,376,303. Other light storing fluorescent materials also naturally can be utilized.

As the coloring agent, use can be made of one obtained by mixing a pearl pigment (for example, Pearl Grace (trade name) produced by Nippon Koken K.K.) in a white ink of, for example, an acrylic resin or a urethane resin. With respect to the variety of the dye or pigment to be employed, one with desired tone is appropriately selected. For example, a white tone pigment component can be selected from among dyes and pigments containing titanium oxide and zinc oxide, a red tone component from among dyes and pigments containing Indian red (ferric oxide), and a green tone component from among dyes and pigments containing chromium oxide. Coloring can be performed by a method in which the above coloring agent is applied as an ink or a paint to the plastic to thereby form a colored coating on the plastic or a method in which the coloring agent is mixed in the plastic and, for example, injection molding is performed to thereby obtain a colored item.

Minute irregularities may be formed at the light-incident-side surface so as to cause it to have a light diffusing function. Further, a reflecting layer can be provided on the solar-cell-side back surface by forming a metal coating as extremely thin as, for example, 1000 to 3000 Å, preferably, 1500 to 2500 Å on the solar-cell-side back surface 82b of the indicating plate substrate 82 with the use of a metal with high light reflectance such as chromium, nickel, aluminum, palladium, rhodium or platinum by, for example, dry plating such as vapor deposition or ion plating.

As apparent from the above, in the use of a plastic, the treatment with a color diffusing agent selected from among a light diffusing agent, a light storing fluorescent material and a coloring agent composed of a dye or pigment enables coloring the indicating plate with a peculiar tone exhibited thereby and improves the visibility of the indicating plate. By virtue of the above light diffusing effect, the underlying solar cell, cross lines, etc. are not viewed through the indicating plate and a design variation inclusive of tone is extensively increased to thereby enhance an appearance quality and, hence, enhance a commercial value. Moreover, in the indicating plate constructed by containing a light storing fluorescent material as a coloring light diffusing agent, not only are the above effects exerted but also light having contributed to power generation of the solar cell in a bright environment excites the long persistent light storing fluorescent material. As a result, luminescence due to the persistence characteristic continues in the night or other dark environment and illuminates the front side of the indicating plate to thereby enable viewing time in the night or other dark environment as well.

Figure 24:
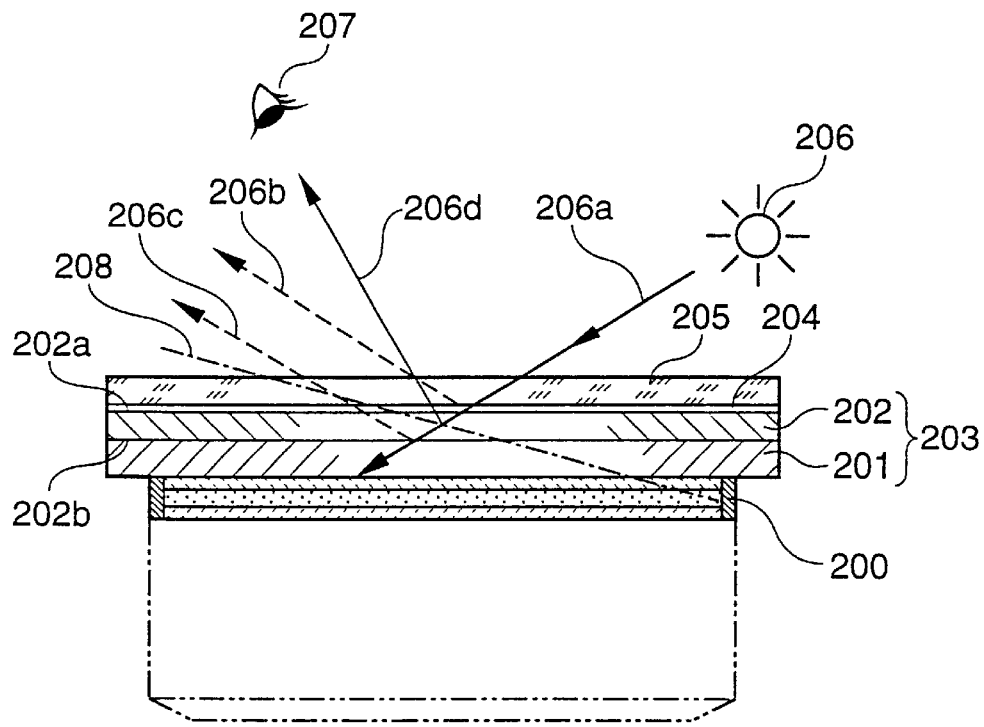
FIG. 24 is a sectional view explaining a material used in equipping an EL having watch with the indicating plate for watch according to the eleventh embodiment of the present invention.

Although used as an indicating plate for solar watch in this embodiment, the indicating plate for watch 120 can be used in an EL (electro-luminescence) equipped watch. In this watch, when the peripheral-side member 122 or inner-boundary-side member 124 consists of a plastic, hologram is used in this material so that the EL cell lying under the indicating plate is not visible through the indicating plate and so that the indicating plate is colored to thereby increase a design variation inclusive of tone. Referring to FIG. 24, such a construction is preferably produced so that reflecting plate 203 consisting of polyester layer or polyethylene terephthalate layer 201 as a transparent resin layer combined with hologram layer 202 is laminated onto EL (electroluminescent) cell 200 and surface protective layer 205 composed of a transparent or translucent synthetic resin is laminated through adhesive 204 to the hologram layer 202. The above reflecting plate 203 is, for example, general volume-type (Lipman) hologram. The function of the above reflecting plate 203 will be described below.

The hologram layer 202 has virtual specular surface 208 which is a reflecting surface other than its upper and lower surfaces 202a, 202b. Accordingly, light 206a incident from light source 206 induces reflection of only light with a specified wavelength which is tilted by the virtual specular surface 208 so that the light is not consistent with the lights 206b, 206c reflected by the upper and lower surfaces 202a, 202b of the hologram layer 202. Therefore, the light 206d reflected by the virtual specular surface 208 exhibits a given predetermined color and reaches the eyes of viewer 207. By this action, the color of the EL cell is concealed and the EL cell is not viewed through the indicating plate. When alternating current is applied to electrodes of the EL cell 200 to thereby cause the EL cell 200 to be luminescent, this luminescence and the light 206d reflected by the virtual specular surface 208 of the hologram layer 202 overlie on each other to thereby enable exhibiting a delicate hue. By virtue of the above tone exhibited by the hologram layer 202, a design variation inclusive of tone is extensively increased to thereby enhance an appearance quality and, hence, enhance a commercial value.

Although the instance of use of the indicating plate for watch 120 as an indicating plate for solar watch or as in an EL (electro-luminescence) equipped watch has been described in this embodiment, it is naturally feasible to use the indicating plate for watch 120 as an indicating plate for ordinary watch.

Moreover, although prints and time characters 20 are formed directly on the upper surface of the indicating plate for watch 120, namely, the upper surface of the peripheral-side member 122 and inner-boundary-side member 124 in this embodiment, the prints and time characters 20 can be formed on the top of a surface protective coating layer composed of a transparent or translucent resin such as an acrylic resin, a urethane resin, an alkyd resin or an epoxy resin, where this surface protective coating layer has been previously formed on the above upper surface. In this construction, the weather and moisture resistances are improved.

The foregoing description is fundamentally valid in the following Examples and, unless otherwise specified, applies thereto.

EXAMPLE 1

A circular ring shaped plate of $Al_2O_3$ (purity: 99.99%, light transmission factor: 50% and surface roughness Ra: 0.05 μm measured by "Surfpak" manufactured by Mitsutoyo Corporation in accordance with JIS B 0601) having a diameter of 26 mm and a thickness of 300 μm, the plate having a central opening with a diameter of 17 mm in the center thereof, was prepared. A disk of onyx of 300 μm thickness having a diameter which was slightly smaller than that of the central opening was fitted in the central opening of the $Al_2O_3$ plate with the use of an epoxy adhesive, thereby obtaining an indicating plate for watch.

The indicating plate for watch was disposed on a solar cell. The light transmission factor was measured and found to be about 30%. The solar cell was not viewed through the indicating plate and the tone realized an appearance of superior quality.

Figure 25:
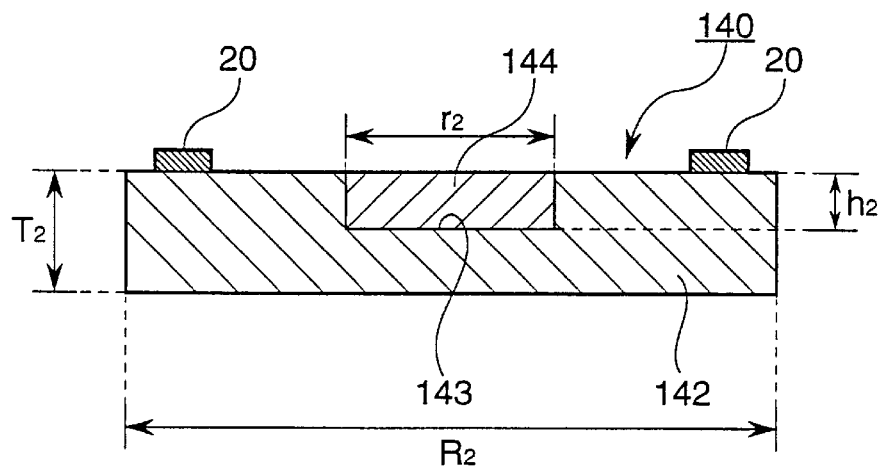
FIG. 25 is a sectional view of the indicating plate for watch according to the twelfth embodiment of the present invention.

FIG. 25 is a sectional view of the indicating plate for watch according to the twelfth embodiment of the present invention.

The indicating plate for watch 140 according to this embodiment comprises nearly disk shaped peripheral-side member 142, this peripheral-side member 142 having central recess 143 formed in its center, and disk shaped inner-boundary-side member 144 fitted in the central recess 143. As in the eleventh embodiment, in the fitting of the inner-boundary-side member 144 in the central recess 143 of the peripheral-side member 142, bonding thereof is effected by the use of an epoxy adhesive, an acrylic adhesive, a urethane adhesive, an adhesive comprising a resin obtained by modifying these resins, or an ultraviolet curable adhesive comprising, for example, a UV curable acrylic resin, a UV curable urethane resin or a UV curable epoxy resin.

The size of the central recess 143 formed in the center of the peripheral-side member 142, namely, the size of the inner-boundary-side member 144 (although slightly smaller than the size of the central recess 143) depends on the relationship of arrangement of prints and time characters 20, the design, the above light transmission factor, etc. and is not particularly limited. However, it is preferred that the diameter r2 of the inner-boundary-side member 144 range from 50 to 70% of the outside diameter R2 of the peripheral-side member 142 and that the thickness t2 of the inner-boundary-side member 144 range from 100 to 250 μm taking the strength into account and range from 20 to 50% of the thickness T2 of the peripheral-side member 142. For example, when the outside diameter R2 and thickness T2 of the peripheral-side member 142 are 26 mm and 500 μm, respectively, the diameter r2 and thickness t2 of the inner-boundary-side member 144 can suitably be 17 mm and 200 μm, respectively. The peripheral-side member 142 can be produced by molding or blanking followed by cutting for forming the recess.

The peripheral-side member 142 and inner-boundary-side member 144, as in the first embodiment, may be composed of respective different materials selected from among appropriate combinations of natural materials, for example, precious stones such as sapphire, blue pearl, onyx and tiger's-eye, shells such as white pearl oyster shell, glass and ceramics such as $Al_2O_3$ and synthetic materials, for example, metals such as titanium, SUS 304 and other stainless steels and brass, german silver and other copper alloys and plastics such as polycarbonate and polyacetal resins.

In the use as an indicating plate for solar watch, it is especially preferred to combine, for example, peripheral-side member 142 composed of a polycarbonate with inner-boundary-side member 144 composed of a metal having been patterned and subjected to surface treatment such as plating or coating from the viewpoint of light transmission, strength and design.

Further, as in the eleventh embodiment, when the peripheral-side member 142 is composed of a synthetic material such as a metal or a plastic, the peripheral-side member 142 is provided with a fixing part, such as protrusion, notch or hole (not shown), for fixing the indicating plate for watch 140 to a watch frame.

Figure 26:
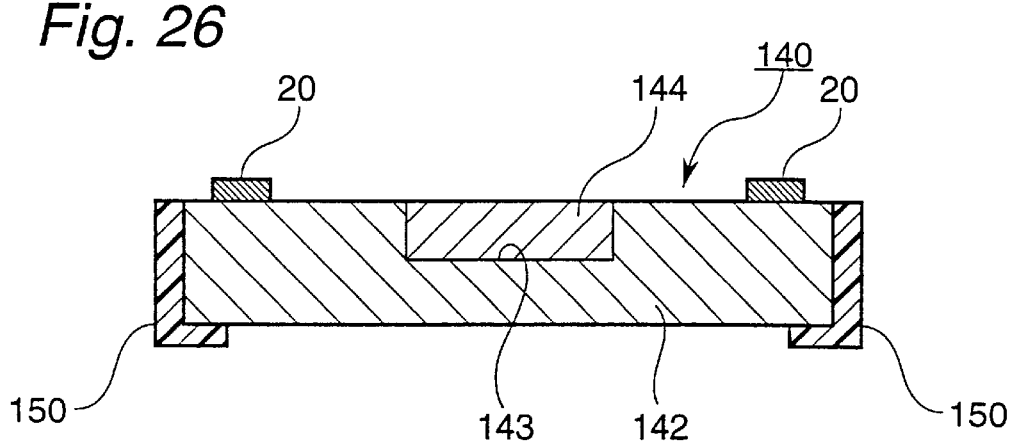
FIG. 26 is a sectional view showing another form of the indicating plate for watch according to the twelfth embodiment of the present invention.

Still further, as in the eleventh embodiment, when a natural material such as a precious stone, a shell or a ceramic is used in the peripheral-side member 142, the periphery of the peripheral-side member 142 is fitted with ringlike mounting member 150 composed of a metal or a plastic and provided with a fixing part, such as protrusion, notch or hole (not shown), for fixing the indicating plate to a watch frame, as shown in FIG. 26. The construction of the mounting member 150 is the same as that of the mounting member 130 of the eleventh embodiment, so that description thereof is dispensed with.

In this embodiment, the peripheral-side member 142 is positioned under (overlaid with) the circular ring shaped inner-boundary-side member 144, so that the solar cell is not viewed through the indicating plate and so that, depending on combination of materials, the tone of the peripheral-side member 142 is overlaid with that of the inner-boundary-side member 144 to thereby enable breeding a delicate hue in the center of the indicating plate.

EXAMPLE 2

A disklike plate of transparent resin such as polycarbonate (polycarbonic ester) resin having a diameter of 26 mm and a thickness of 300 μm, the plate having a central recess with a diameter of 17 mm and a depth of 150 μm in the center thereof, was prepared. 10% by weight of a light diffusing agent of powdery calcium carbonate (particle size: about 8 to 12 μm) was milled with a powdery green luminescent light storing fluorescent material of $BaAl_2O$, and a binder of acrylic transparent resin was mixed thereinto in an amount of 50 parts by weight per 100 parts by weight of the light storing fluorescent material. The mixture was applied onto the front side of the transparent resin plate as an indicating plate substrate so that a light storing fluorescent layer with a thickness of 100 μm was formed.

A disk of white pearl oyster shell of 200 μm thickness having a diameter which was slightly smaller than that of the central recess was fitted in the central recess of the polycarbonate resin plate with the use of an epoxy adhesive, thereby obtaining an indicating plate for watch.

The indicating plate for watch was disposed on a solar cell. The light transmission factor was measured and found to be about 40%. The tone thereof was a light green tone exhibited by the light storing fluorescent material. The solar cell was not viewed through the indicating plate and the tone thereof was one of a superior-quality appearance attributed to the light rainbow color of white pearl oyster shell and the light green tone.

Figure 27:
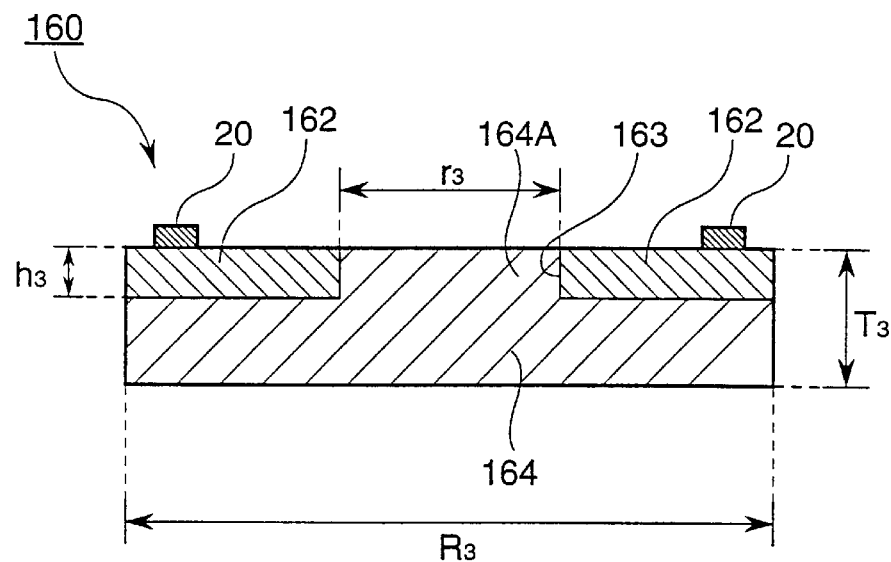
FIG. 27 is a sectional view of the indicating plate for watch according to the thirteenth embodiment of the present invention.

FIG. 27 is a sectional view of the indicating plate for watch according to the thirteenth embodiment of the present invention.

The indicating plate for watch 160 according to this embodiment comprises circular ring shaped peripheral-side member 162 and nearly disk shaped inner-boundary-side member 164, in which cylindrical central protrusion 164A provided in the inner-boundary-side member 164 is fitted in central opening 163 provided in the center of the peripheral-side member 162 so that the peripheral-side member 162 and the inner-boundary-side member 164 are coupled with each other. As in the eleventh embodiment, in the fitting of the inner-boundary-side member 164 in the peripheral-side member 162, bonding thereof is effected by the use of an epoxy adhesive, an acrylic adhesive, a urethane adhesive, an adhesive comprising a resin obtained by modifying these resins, or an ultraviolet curable adhesive comprising, for example, a UV curable acrylic resin, a UV curable urethane resin or a UV curable epoxy resin.

Although the size of the central opening 163 formed in the center of the peripheral-side member 162, namely, the size of the cylindrical central protrusion 164A provided in the inner-boundary-side member 164 (although slightly smaller than the size of the central opening 163) corresponds to the size of the inner-boundary-side member 164 which appears on the surface of the indicating plate for watch 160. This size depends on the relationship of arrangement of prints and time characters 20, the design, the above light transmission factor, etc. and is not particularly limited. However, it is preferred that the diameter r3 of the central protrusion 164A range from 50 to 70% of the outside diameter R3 of the peripheral-side member 162 and that the height h3 of the central protrusion 164A range from 100 to 250 $\mu$m taking the strength, etc. into account and range from 20 to 50% of the total thickness T3 of the indicating plate for watch 160. For example, when the total thickness T3 of the indicating plate for watch 160 and the outside diameter R3 of the peripheral-side member 162 are 500 $\mu$m and 26 mm, respectively, the diameter r3 and height h3 of the central protrusion 164A can suitably be 17 mm and 200 $\mu$m, respectively. The inner-boundary-side member 164 can be produced by molding or blanking followed by cutting for forming the recess.

The peripheral-side member 162 and inner-boundary-side member 164, as in the eleventh embodiment, may be composed of respective different materials selected from among appropriate combinations of natural materials, for example, precious stones such as sapphire, blue pearl, onyx and tiger's-eye, shells such as white pearl oyster shell, glass and ceramics such as $Al_2O_3$ and synthetic materials, for example, metals such as titanium, SUS 304 and other stainless steels and brass, german silver and other copper alloys and plastics such as polycarbonate and polyacetal resins.

In the use as an indicating plate for solar watch, it is especially preferred to combine, for example, peripheral-side member 162 composed of white pearl oyster shell with inner-boundary-side member 164 composed of a ceramic from the viewpoint of light transmission and design.

Further, as in the eleventh embodiment, when the peripheral-side member 162 is composed of a synthetic material such as a metal or a plastic, the peripheral-side member 162 is provided with a fixing part, such as protrusion, notch or hole (not shown), for fixing the indicating plate for watch 160 to a watch frame. In this embodiment, the inner-boundary-side member 164 is also positioned at the extreme peripheral side of the indicating plate for watch 160, so that it is naturally feasible to fit the fixing part thereto.

Figure 28:
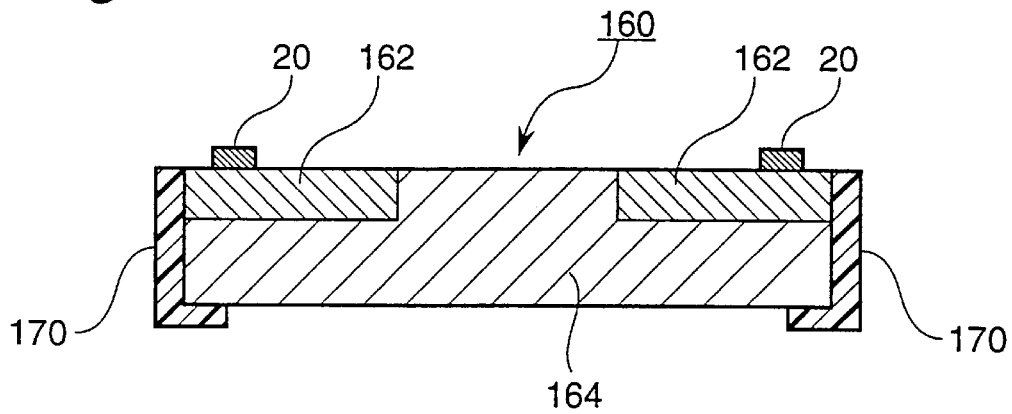
FIG. 28 is a sectional view showing another form of the indicating plate for watch according to the thirteenth embodiment of the present invention.

Still further, as in the eleventh embodiment, when a natural material such as a precious stone, a shell or a ceramic is used in the peripheral-side member 162, the periphery of the peripheral-side member 162 is fitted with ringlike mounting member 170 composed of a metal or a plastic and provided with a fixing part, such as protrusion, notch or hole (not shown), for fixing the indicating plate to a watch frame, as shown in FIG. 28. The construction of the mounting member 170 is the same as that of the mounting member 130 of the eleventh embodiment, so that description thereof is omitted.

In this embodiment, the inner-boundary-side member 164 is positioned under (overlaid with) the circular ring shaped peripheral-side member 162, so that there is no possibility of the solar cell being viewed through the indicating plate and so that, depending on combination of materials, the tone of the inner-boundary-side member 164 is overlaid with that of the peripheral-side member 162 to thereby enable breeding a delicate hue in the periphery of the indicating plate.

EXAMPLE 3

A nearly disk shaped plate of transparent resin such as polycarbonate (polycarbonic ester) resin having a diameter of 26 mm and a thickness of 300 $\mu$m, the plate having a central protrusion with a diameter of 17 mm and a height of 200 $\mu$m in the center thereof, was prepared. 10% by weight of a light diffusing agent of powdery calcium carbonate (particle size: about 8 to 12 $\mu$m) was milled with a powdery green luminescent light storing fluorescent material of $BaAl_2O$, and a binder of acrylic transparent resin was mixed thereinto in an amount of 50 parts by weight per 100 parts by weight of the light storing fluorescent material, and the mixture was applied onto the front side of the transparent resin plate as an indicating plate substrate so that a light storing fluorescent layer with a thickness of 100 $\mu$m was formed.

A circular ring of colored ceramic of 200 $\mu$m thickness having an inside diameter which was slightly larger than that of the central protrusion was fitted to the central opening of the $Al_2O_3$ plate with the use of an epoxy adhesive, thereby obtaining an indicating plate for watch.

The indicating plate for watch was disposed on a solar cell. The light transmission factor was measured and found to be about 40%. The tone thereof was a light green tone exhibited by the light storing fluorescent material. The solar cell was not viewed through the indicating plate and the tone thereof was one of a superior-quality appearance attributed to the green of colored ceramic (by green glaze applied to the ceramic surface) and the light green tone. A delicate tone was bred especially at the periphery.

Figure 29:
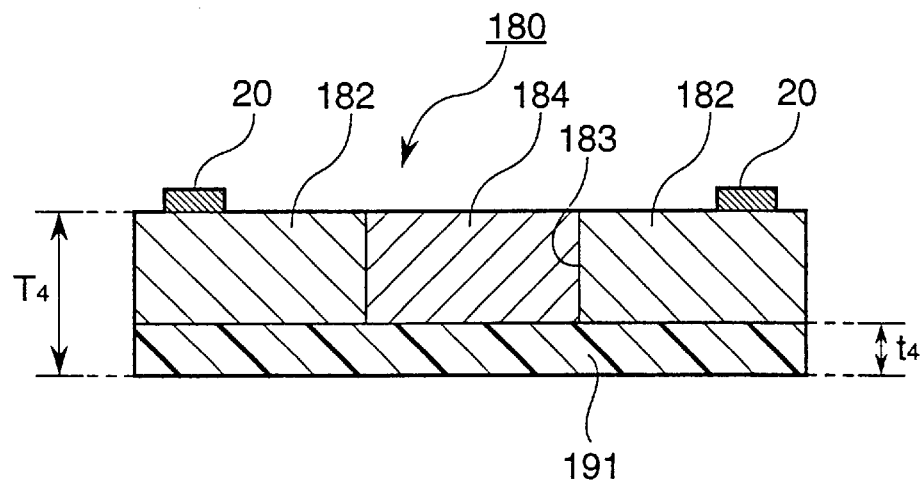
FIG. 29 is a sectional view of the indicating plate for watch according to the fourteenth embodiment of the present invention.

FIG. 29 is a sectional view of the indicating plate for watch according to the fourteenth embodiment of the present invention.

The fundamental construction of the indicating plate for watch 180 according to this embodiment is the same as in the eleventh embodiment in that it comprises peripheral-side member 182 with a circular ring shape, the peripheral-side member 182 provided with circular central opening 183, and disk-shaped inner-boundary-side member 184 fitted in the circular central opening 183. However, the two constructions are different from each other in that base material 191 is bonded to backs, namely, the solar cell side thereof. Because the constructions are the same with each other except for the base material 191, description thereof will be dispensed with.

The bonding of the base material 191 to the inner-boundary-side member 184 and the peripheral-side member 182 can be effected by the use of an epoxy adhesive, an acrylic adhesive, a urethane adhesive, an adhesive comprising a resin obtained by modifying these resins, or an ultraviolet curable adhesive comprising, for example, a UV curable acrylic resin, a UV curable urethane resin or a UV curable epoxy resin, as in the eleventh embodiment.

With respect to the size of the base material 191, it is preferred that the diameter thereof be the same as that of the peripheral-side member 182 and that the thickness t4 of the base material 191 range from 20 to 40% of the total thickness T4 of the indicating plate for watch 180. For example, when the total thickness T4 of the indicating plate for watch 180 is 500 $\mu$m, the thickness t4 of the base material 191 can suitably be 200 $\mu$m.

The material for forming the base material 191 is the same as in the inner-boundary-side member 184 and the peripheral-side member 182 and can be selected from among natural materials, for example, precious stones such as sapphire, blue pearl, onyx and tiger's-eye, shells such as white pearl oyster shell, glass and ceramics such as $Al_2O_3$, synthetic materials, for example, metals (having slits or holes for transmitting light) such as titanium, SUS 304 and other stainless steels and brass, german silver and other copper alloys and plastics such as polycarbonate and polyacetal resins, and appropriate combinations thereof.

In the use as an indicating plate for solar watch, it is especially preferred to combine, for example, peripheral-side member 182 composed of white pearl oyster shell with inner-boundary-side member 184 composed of a precious stone such as blue pearl from the viewpoint of design realizing an appearance of superior quality.

Further, as in the eleventh embodiment, when the peripheral-side member 182 is composed of a synthetic material such as a metal or a plastic, the peripheral-side member 182 is provided with a fixing part, such as protrusion, notch or hole (not shown), for fixing the indicating plate for watch 180 to a watch frame. In this embodiment, the base material 191 is also positioned at the extreme peripheral side of the indicating plate for watch 180, so that it is naturally feasible to fit the fixing part thereto.

Figure 30:
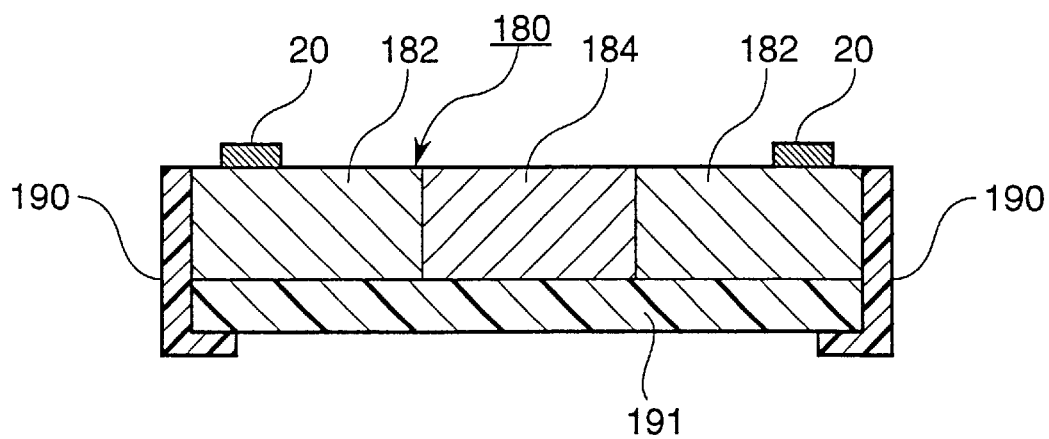
FIG. 30 is a sectional view showing another form of the indicating plate for watch according to the fourteenth embodiment of the present invention.

Still further, as in the eleventh embodiment, when a natural material such as a precious stone, a shell or a ceramic is used in the peripheral-side member 182 and base material 191, the periphery of the peripheral-side member 182 and base material 191 is fitted with ringlike mounting member 190 composed of a metal or a plastic and provided with a fixing part, such as protrusion, notch or hole (not shown), for fixing the indicating plate to a watch frame, as shown in FIG. 30. The construction of the mounting member 190 is the same as that of the mounting member 130 of the eleventh embodiment, so that description thereof is dispensed with.

In this embodiment, the base material 191 is positioned under (overlaid with) the peripheral-side member 182 and the inner-boundary-side member 184, so that not only is a strength increase attained but also the solar cell is not viewed through the indicating plate. Moreover, depending on combination of materials, a delicate tone can be bred on the entirety of the indicating plate by the tone of the base material overlaid with the tone of the peripheral-side member 182 and inner-boundary-side member 184.

EXAMPLE 4

A circular ring shaped plate of white pearl oyster shell having a diameter of 26 mm and a thickness of 200 $\mu$m, the plate having a central opening with a diameter of 17 mm in the center thereof, was prepared. A disk of blue tiger's-eye of 200 $\mu$m thickness having a diameter which was slightly smaller than that of the central opening was fitted in the central opening of the $Al_2O_3$ plate with the use of an epoxy adhesive, thereby obtaining an indicating plate for watch. A plate of white pearl oyster shell having a diameter of 26 mm and a thickness of 100 $\mu$m was bonded to the lower surface of the indicating plate for watch by the use of an epoxy adhesive.

The indicating plate for watch was disposed on a solar cell. The light transmission factor was measured and found to be about 40%. The solar cell was not visible through the indicating plate and the tone thereof realized an appearance of superior quality attributed to the white tone of the white pearl oyster shell and the blue tone of the blue tiger's-eye. A delicate tone was bred especially in the center.

Figure 31:
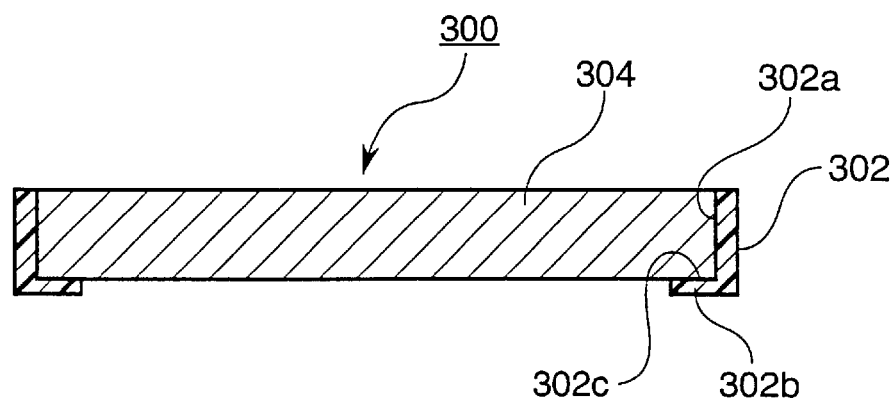
FIG. 31 is a sectional view of the indicating plate for watch according to the fifteenth embodiment of the present invention.

FIG. 31 is a sectional view of the indicating plate for watch according to the fifteenth embodiment of the present invention.

The indicating plate for watch 300 according to this embodiment comprises disklike inner-boundary-side member 304 and nearly circular ring shaped peripheral-side member 302 fitted to periphery of the inner-boundary-side member 304.

When the inner-boundary-side member 304 is composed of a natural material such as a precious stone, a shell or a ceramic, working the inner-boundary-side member 304 so as to have protrusion, notch, etc. is difficult and causes a cost increase. Therefore, in this embodiment, the peripheral-side member 302 per se is furnished with the same construction as that of the mounting member 130 of the eleventh embodiment. That is, the construction of this embodiment is such that ring shaped peripheral-side member 302 composed of a metal or a plastic and provided with a fixing part for fixing the indicating plate to a watch frame is fitted to periphery of inner-boundary-side member 304.

In particular, a back side of the peripheral-side member 302 is provided with collar part 302*b* that is protrudent inward from a circumferential part of central opening 302*a* provided in the peripheral-side member 302. The above central opening 302*a* and the above collar part 302*b* form recess 302*c*, in which the inner-boundary-side member 304 is fitted. The size of the peripheral-side member 302, etc. are the same as in the eleventh embodiment, so that description thereof is dispensed with.

Figure 35:
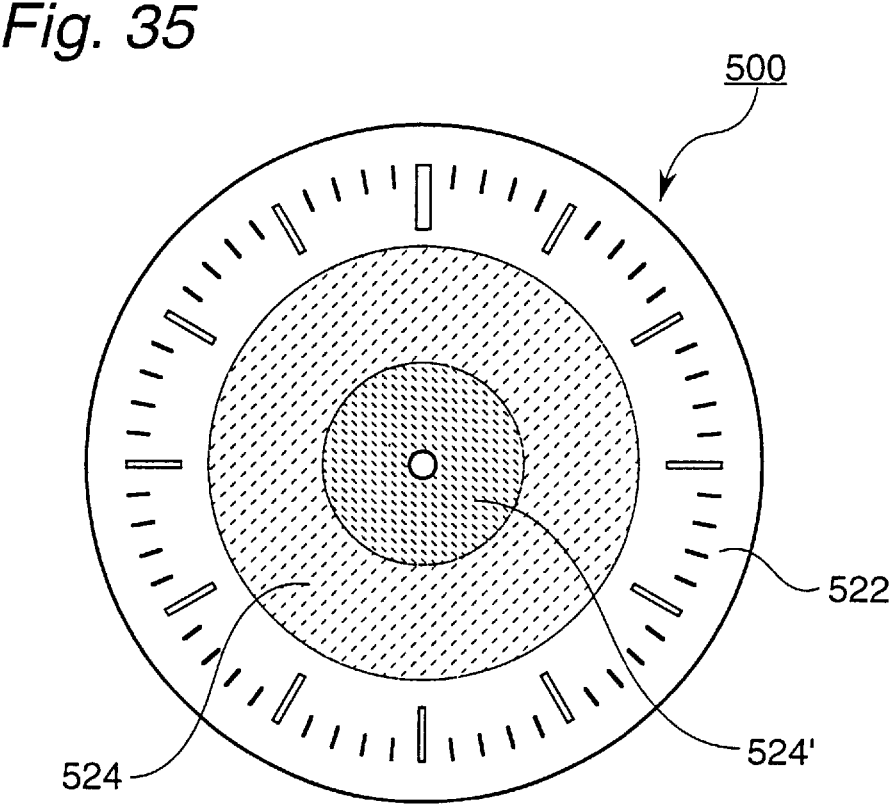
FIG. 35 is a plan view showing a further form of the indicating plate for watch according to the present invention.

The use of two different members and the construction of inner-boundary-side member and peripheral-side member have been described in the above embodiments. However, at least portion of the indicating plate exposed at its front side may be composed of at least two different types of indicating members. For example, referring to FIG. 35, the front side of indicating plate 500 can be composed of three types of members, i.e., peripheral-side member 522 and two different members 524, 524' arranged thereinside and bonded with an adhesive. This enables increasing a design variation.

Figure 34:
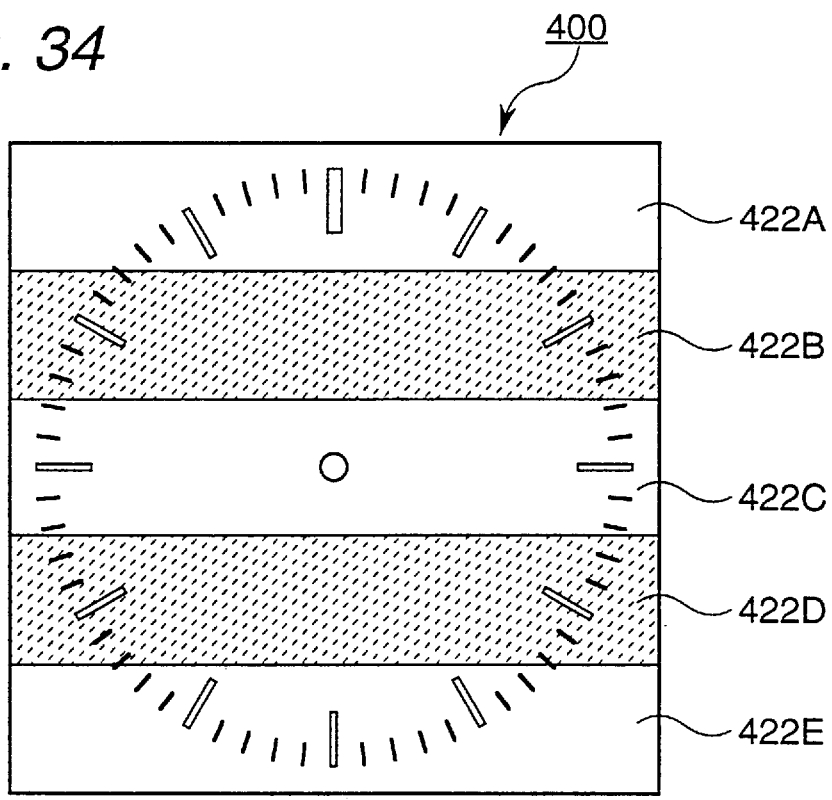
FIG. 34 is a plan view showing another form of the indicating plate for watch according to the present invention.

When the outline of the indicating plate is deformed (other than circular form), referring to FIG. 34, the front side of indicating plate 400 may be striped by arranging at least two different members 422A to 422E in stripe form and bonding them to each other with an adhesive. This enables not only increasing a design variation of deformed indicating plate but also providing an indicating plate with an appearance of unprecedented superior quality.

EFFECT OF THE INVENTION

In the indicating plate for solar watch according to the present invention, the indicating plate comprises a color diffusion plate adapted to transmit portion of light having a wavelength within a range capable of causing a solar cell housed under the indicating plate to generate power, out of light at least incident upon the indicating plate, through the indicating plate downward, the above color diffusion plate adapted to render difficult viewing of the solar cell from outside through the indicating plate and adapted to impart color tone to the indicating plate. The use of a coloring agent, a coloring light diffusing agent, a colored translucent substrate, a pattern layer/colored thin film layer and a diffusion layer not only enables coloring the indicating plate by virtue of peculiar tone exhibited by these to thereby enhance the visibility of the indicating plate but also prevents viewing of the underlying solar cell, cross lines, etc. through the indicating plate by virtue of the light diffusing effect thereof. As a result, a design variation inclusive of tone and pattern imparting an appearance of superior quality is extensively increased to thereby enhance an appearance quality and, hence, enhance a commercial value.

In the indicating plate constructed by containing a light storing fluorescent material as a coloring light diffusing agent, not only are the above effects exerted but also light having contributed to power generation of the solar cell in a bright environment excites the long persistent light storing fluorescent material. As a result, that luminescence due to the persistence characteristic continues in the night or other dark environment and illuminates the front side of the indicating plate to thereby enable viewing time in the night or other dark environment as well.

Further, the indicating plate for watch according to the present invention may be a disklike indicating plate for watch adapted to be assembled in a watch frame, which has at least portion thereof exposed at its front side composed of an indicating member comprising at least two different types of members and at least one of which is capable of transmitting light downward. This indicating member may comprise an inner-boundary-side member and a peripheral-side member. The inner-boundary-side member and peripheral-side member are composed of a natural material such as a precious stone, a shell, a glass or a ceramic, a metal or a plastic, so that, when it is used as an indicating plate for solar watch or an indicating plate for EL watch, not only is viewing of the solar cell, insulating band cross lines, EL cell, etc. through the indicating plate prevented but also deteriorations of the function and the appearance and commercial value can be avoided.

The indicating plate can be colored and multicolored. Free combination with a high-quality material such as a precious stone enables the increase of design variation as in the conventional indicating plate for watch and enables providing a high-quality watch with an appearance of superior quality.

When the peripheral-side member is composed of a natural material selected from among precious stones, shells, glasses and ceramics, the indicating plate may be so constructed that periphery of the peripheral-side member is fitted with a ringlike mounting member composed of a metal or a plastic and provided with a fixing part for fixing the indicating plate to a watch frame. Although it is difficult, inviting a cost increase, to work the peripheral-side member so as to provide a protrusion, notch or the like for fixing the indicating plate to a watch frame, the use of the above mounting member facilitates such working. Furthermore, a spacing corresponding to the thickness of a collar part of the mounting member is provided between the indicating plate members and the module arranged thereunder. Therefore, even if the module is deformed, for example, at the time of impact, the influence of the deformation is avoided and the indicating plate for watch does not suffer from cracking or damaging. Thus, neither appearance nor product quality is deteriorated.

In the indicating plate constructed by using as a material a plastic containing a light storing fluorescent material as a coloring light diffusing agent, not only are the solar cell, etc. not visible through the indicating plate, but also light having contributed to power generation of the solar cell in a bright environment excites the long persistent light storing fluorescent material. As a result, luminescence due to the persistence characteristic continues in the night or other dark environment and illuminates the front side of the indicating plate to thereby enable viewing time in the night or other dark environment as well.

In the use of hologram, color of visible radiation region can be realized, so that a large variety of color expressions can be performed.

The indicating plate for solar watch according to the present invention can ensure a light transmission of at least 10%, preferably, at least 50% irrespective of the variety of construction, so that power generation of the solar cell is not hampered. Thus, the watch continues to work without inadvertent stopping.

What is claimed is:

1. An indicating plate for a solar watch included in an indicating plate structure for the solar watch comprising a solar cell housed in a watch and an indicating plate for the solar watch arranged on the front side of the solar cell, said indicating plate consisting of an indicating plate substrate comprising a transparent resin disposed on an upper surface of the solar cell and a light storing fluorescent layer, which includes a light diffusing agent and a light storing fluorescent material, which provides a diffusing function of one or both of color and light, formed on a light incident side of the indicating plate substrate; said indicating plate substrate being adapted to transmit a portion of light having a wavelength within a range capable of causing the solar cell housed under the indicating plate to generate power, out of light at least incident upon the indicating plate, through the indicating plate downward, said indicating plate and substrate adapted to render difficult viewing of the solar cell from outside through the indicating plate and adapted to impart color tone to the indicating plate.

2. The indicating plate for a solar watch as claimed in claim 1, said indicating plate comprising an indicating plate substrate composed of a transparent resin and a light storing fluorescent layer formed on a light-incident-side surface of the indicating plate substrate, said light storing fluorescent layer comprising a light diffusing agent and, as a coloring light diffusing agent, a light storing fluorescent material.

3. The indicating plate for a solar watch as claimed in claim 2, wherein the indicating plate substrate contains a light storing fluorescent material as a coloring light diffusing agent.

4. The indicating plate for a solar watch as claimed in claim 1, said indicating plate comprising an indicating plate substrate composed of a transparent resin containing a light storing fluorescent material as a coloring light diffusing agent and a light storing fluorescent layer formed on a light-incident-side surface of the indicating plate substrate, said light storing fluorescent layer comprising a light storing fluorescent material as a coloring light diffusing agent.

5. The indicating plate for a solar watch as claimed in claim 2, wherein a transparent or translucent surface protective coating layer is formed on an upper surface of the light storing fluorescent layer.

6. The indicating plate for a solar watch as claimed in claim 1, said indicating plate comprising an indicating plate substrate composed of a transparent resin and a colored layer formed on a light-incident-side surface of the indicating plate substrate, said colored layer comprising a coloring agent.

7. The indicating plate for a solar watch as claimed in claim 1, said indicating plate comprising an indicating plate substrate composed of a transparent resin and a colored layer formed on a solar-cell-side surface of the indicating plate substrate, said colored layer comprising a coloring agent, said indicating plate substrate having minute irregularities formed on its light-incident-side surface.

8. The indicating plate for a solar watch as claimed in claim 1, said indicating plate comprising an indicating plate substrate composed of a transparent resin containing a dye or pigment as a coloring agent, said indicating plate substrate having minute irregularities with light diffusing function formed on its light-incident-side surface.

9. The indicating plate for a solar watch as claimed in claim 8, wherein the transparent resin of the indicating substrate further contains a light diffusing agent.

10. The indicating plate for a solar watch as claimed in claim 1, said indicating plate comprising an indicating plate substrate composed of a transparent resin containing a light diffusing agent and a reflecting layer formed on a solar-cell-side surface of the indicating plate substrate.

11. The indicating plate for a solar watch as claimed in claim 10, wherein the indicating plate substrate composed of a transparent resin has minute irregularities with light diffusing function formed on its light-incident-side surface.

12. The indicating plate for a solar watch as claimed in claim 1, said indicating plate comprising a colored translucent substrate capable of transmitting light, a pattern layer disposed on a front side of the colored translucent substrate and a colored thin film layer disposed on a back side of the colored translucent substrate.

13. The indicating plate for a solar watch as claimed in claim 12, wherein the colored thin film layer is a metallized layer.

14. The indicating plate for a solar watch as claimed in claim 1, said indicating plate comprising a transparent substrate capable of transmitting light, a pattern layer disposed on a front side of the transparent substrate, a diffusion layer disposed on a back side of the transparent substrate and a colored thin film layer disposed on the diffusion layer.

15. The indicating plate for a solar watch as claimed in claim 14, wherein the transparent substrate, the pattern layer and the diffusion layer are monolithically formed.

16. The indicating plate for a solar watch as claimed in claim 14, wherein the colored thin film layer is a metallized layer.

17. A disklike indicating plate for a watch adapted to be assembled in a watch frame, said indicating plate has at least a portion thereof exposed at its front side composed of an indicating member comprising at least two different types of members and at least one of which is capable of transmitting light downward.

18. The indicating plate for a watch as claimed in claim 17, wherein the indicating member comprises an inner-boundary-side member and a peripheral-side member.

19. The indicating plate for a watch as claimed in claim 18, wherein the inner-boundary-side member is fitted in a central opening provided in the peripheral-side member.

20. The indicating plate for a watch as claimed in claim 18, wherein the inner-boundary-side member is fitted in a central recess provided in the peripheral-side member.

21. The indicating plate for a watch as claimed in claim 18, wherein a central protrusion provided in the inner-boundary-side member is fitted in a central opening provided in the peripheral-side member so that the inner-boundary-side member is coupled with the peripheral-side member.

22. The indicating plate for a watch as claimed in claim 18, wherein the inner-boundary-side member is composed of a natural material selected from among precious stones, shells, glasses and ceramics or a synthetic material selected from among metals and plastics.

23. The indicating plate for a watch as claimed in claim 18, wherein the peripheral-side member is composed of a natural material selected from among precious stones, shells, glasses and ceramics or a synthetic material selected from among metals and plastics.

24. The indicating plate for a watch as claimed in claim 23, wherein the peripheral-side member is composed of a synthetic material selected from among metals and plastics and wherein the peripheral-side member is provided with a fixing part for fixing the indicating plate to a watch frame.

25. The indicating plate for a watch as claimed in claim 24, wherein a back side of the peripheral-side member is provided with a collar part that is protrudent inward from a circumferential part of a central opening provided in the peripheral-side member, said central opening and said collar part forming a recess, and wherein the inner-boundary-side member is fitted in the recess.

26. The indicating plate for a watch as claimed in claim 23, wherein the peripheral-side member is composed of a natural material selected from among precious stones, shells, glasses and ceramics and wherein a periphery of the peripheral-side member is fitted with a ringlike mounting member composed of a metal or a plastic and provided with a fixing part for fixing the indicating plate to a watch frame.

27. The indicating plate for a watch as claimed in claim 26, wherein a back side of the mounting member is provided with a collar part that is protrudent inward from a circumferential part of a central opening provided in the mounting member, said central opening and said collar part forming a recess, and wherein the peripheral-side member is fitted in the recess.

28. The indicating plate for a watch as claimed in claim 18, wherein a base material is bonded to backs of the inner-boundary-side member and the peripheral-side member.

29. The indicating plate for a watch as claimed in claim 28, wherein the base material is composed of a natural material selected from among precious stones, shells, glasses and ceramics or a synthetic material selected from among metals and plastics.

30. The indicating plate for a watch as claimed in claim 29, wherein the peripheral-side member or base material is composed of a synthetic material selected from among metals and plastics and wherein the peripheral-side member or base material is provided with a fixing part for fixing the indicating plate to a watch frame.

31. The indicating plate for a watch as claimed in claim 29, wherein the peripheral-side member or base material is composed of a natural material selected from among precious stones, shells, glasses and ceramics and wherein a periphery of the peripheral-side member or base material is fitted with a ringlike mounting member composed of a metal or a plastic and provided with a fixing part for fixing the indicating plate to a watch frame.

32. The indicating plate for a watch as claimed in claim 31, wherein a back side of the mounting member is provided with a collar part that is protrudent inward from a circumferential part of a central opening provided in the mounting member, said central opening and said collar part forming a recess, and wherein the peripheral-side member or base material is fitted in the recess.

33. The indicating plate for a watch as claimed in claim 24, wherein the fixing part is composed of a protrusion, a notch or a hole.

34. The indicating plate for a watch as claimed in claim 17, said indicating plate is an indicating plate for solar watch included in an indicating plate structure for solar watch comprising a solar cell housed in a watch and an indicating plate for solar watch arranged on a front side of the solar cell.

35. The indicating plate for a watch as claimed in claim 34, said indicating plate has a transmission factor of light contributing to power generation of 10 to 60%.

36. The indicating plate for a watch as claimed in claim 17, wherein the plastic is a transparent resin and treated with at least one color diffusing agent selected from among a light diffusing agent, a light storing fluorescent material and a coloring agent composed of a dye or a pigment.

37. The indicating plate for a solar watch as claimed in claim 3, wherein a transparent or translucent surface protective coating layer is formed on an upper surface of the light storing fluorescent layer.

38. The indicating plate for a solar watch as claimed in claim 4, wherein a transparent or translucent surface protective coating layer is formed on an upper surface of the light storing fluorescent layer.

39. The indicating plate for a solar watch as claimed in claim 15, wherein the colored thin film layer is a metallized layer.

40. The indicating plate for a watch as claimed in claim 19, wherein the inner-boundary-side member is composed of a natural material selected from among precious stones, shells, glasses and ceramics or a synthetic material selected from among metals and plastics.

41. The indicating plate for a watch as claimed in claim 20, wherein the inner-boundary-side member is composed of a natural material selected from among precious stones, shells, glasses and ceramics or a synthetic material selected from among metals and plastics.

42. The indicating plate for a watch as claimed in claim 21, wherein the inner-boundary-side member is composed of a natural material selected from among precious stones, shells, glasses and ceramics or a synthetic material selected from among metals and plastics.

43. The indicating plate for a watch as claimed in claim 19, wherein the peripheral-side member is composed of a natural material selected from among precious stones, shells, glasses and ceramics or a synthetic material selected from among metals and plastics.

44. The indicating plate for a watch as claimed in claim 20, wherein the peripheral-side member is composed of a natural material selected from among precious stones, shells, glasses and ceramics or a synthetic material selected from among metals and plastics.

45. The indicating plate for a watch as claimed in claim 21, wherein the peripheral-side member is composed of a natural material selected from among precious stones, shells, glasses and ceramics or a synthetic material selected from among metals and plastics.

46. The indicating plate for a watch as claimed in claim 22, wherein the peripheral-side member is composed of a natural material selected from among precious stones, shells, glasses and ceramics or a synthetic material selected from among metals and plastics.

47. The indicating plate for a watch as claimed in claim 19, wherein a base material is bonded to backs of the inner-boundary-side member and the peripheral-side member.

48. The indicating plate for a watch as claimed in claim 22, wherein a base material is bonded to backs of the inner-boundary-side member and the peripheral-side member.

49. The indicating plate for a watch as claimed in claim 23, wherein a base material is bonded to backs of the inner-boundary-side member and the peripheral-side member.

50. The indicating plate for a watch as claimed in claim 26, wherein the fixing part is composed of a protrusion, a notch or a hole.

51. The indicating plate for a watch as claimed in claim 30, wherein the fixing part is composed of a protrusion, a notch or a hole.

52. The indicating plate for a watch as claimed in claim 31, wherein the fixing part is composed of a protrusion, a notch or a hole.

53. The indicating plate for a watch as claimed in claim 18, said indicating plate is an indicating plate for solar watch included in an indicating plate structure for solar watch comprising a solar cell housed in a watch and an indicating plate for solar watch arranged on a front side of the solar cell.

54. The indicating plate for a watch as claimed in claim 21, said indicating plate is an indicating plate for solar watch included in an indicating plate structure for solar watch comprising a solar cell housed in a watch and an indicating plate for solar watch arranged on a front side of the solar cell.

55. The indicating plate for a watch as claimed in claim 18, wherein the plastic is a transparent resin and treated with at least one color diffusing agent selected from among a light diffusing agent, a light storing fluorescent material and a coloring agent composed of a dye or a pigment.

56. The indicating plate for a watch as claimed in claim 21, wherein the plastic is a transparent resin and treated with at least one color diffusing agent selected from among a light diffusing agent, a light storing fluorescent material and a coloring agent composed of a dye or a pigment.

57. The indicating plate for a watch as claimed in claim 35, wherein the plastic is a transparent resin and treated with at least one color diffusing agent selected from among a light diffusing agent, a light storing fluorescent material and a coloring agent composed of a dye or a pigment.

* * * * *

UNITED STATES PATENT AND TRADEMARK OFFICE
CERTIFICATE OF CORRECTION

PATENT NO.    : 6,466,522 B1
DATED         : October 15, 2002
INVENTOR(S)   : Hideki Yoshioka et al.

It is certified that error appears in the above-identified patent and that said Letters Patent is hereby corrected as shown below:

Column 2,
Line 26, "generation. performance" should read -- generation performance -- (delete period).

Column 4,
Line 16, after "light-incident-side" delete semicolon (;).

Column 10,
Line 33, heading "DETAILED DESCRIPTION OF" should read -- DETAILED DESCRIPTION OF THE INVENTION --.

Column 15,
Line 46, "alight" should read -- a light --.

Column 19,
Line 57, "dye or-pigment" should read -- dye or pigment -- (delete hyphen).

Column 22,
Line 21, "7% by eight" should read -- 7% by weight --.

Signed and Sealed this

Eleventh Day of March, 2003

JAMES E. ROGAN
*Director of the United States Patent and Trademark Office*